United States Patent
Fang et al.

(10) Patent No.: US 11,100,566 B2
(45) Date of Patent: *Aug. 24, 2021

(54) SYSTEMS, APPARATUSES, AND METHODS FOR ORDERING ITEMS FROM AN ELECTRONIC MENU, AND SERVICING THEREOF

(71) Applicant: TOUCHTUNES MUSIC CORPORATION, New York, NY (US)

(72) Inventors: Yu Fang, Los Altos Hills, CA (US); Robert R. Dykes, Los Altos Hills, CA (US); Heidi Gibson, Los Altos Hills, CA (US)

(73) Assignee: TouchTunes Music Corporation, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/225,860

(22) Filed: Dec. 19, 2018

(65) Prior Publication Data

US 2019/0122291 A1     Apr. 25, 2019

Related U.S. Application Data

(60) Continuation of application No. 15/098,871, filed on Apr. 14, 2016, now Pat. No. 10,192,257, which is a division of application No. 14/666,847, filed on Mar. 24, 2015, now Pat. No. 9,582,825.

(60) Provisional application No. 61/969,630, filed on Mar. 24, 2014.

(51) Int. Cl.
*G06Q 30/06* (2012.01)
*G06Q 50/12* (2012.01)

(52) U.S. Cl.
CPC ........ *G06Q 30/0635* (2013.01); *G06Q 50/12* (2013.01)

(58) Field of Classification Search
USPC .................. 235/375, 379–385; 705/5, 35–45
See application file for complete search history.

(56) References Cited

U.S. PATENT DOCUMENTS

| | | |
|---|---|---|
| 6,285,374 B1 | 9/2001 | Falcon |
| 7,144,322 B2 | 12/2006 | Gomez |
| 7,454,370 B2 | 11/2008 | Baril |
| 9,177,314 B2 | 11/2015 | Uzo |
| 9,582,825 B2 * | 2/2017 | Fang ............... G06Q 50/12 |
| 10,192,257 B2 * | 1/2019 | Fang ............... G06Q 50/12 |
| 2005/0237321 A1 | 10/2005 | Young et al. |

(Continued)

OTHER PUBLICATIONS

U.S. Appl. No. 61/901,400, filed Nov. 7, 2013.

(Continued)

*Primary Examiner* — Matthew Mikels
(74) *Attorney, Agent, or Firm* — Nixon & Vanderhye, PC

(57) ABSTRACT

Systems and methods for ordering items from an electronic menu and servicing thereof, in a networked computing environment that communicably connects via at least one network at least a plurality of first handheld electronic devices (e.g., wait staff operated devices in a restaurant), a plurality of second handheld electronic devices (e.g., patron operated devices in a restaurant) configured to display the electronic menu, and a venue computer are described. Corresponding apparatuses are also described.

4 Claims, 36 Drawing Sheets

(56) References Cited

U.S. PATENT DOCUMENTS

| | | |
|---|---|---|
| 2007/0038727 A1 | 2/2007 | Bailey et al. |
| 2007/0205278 A1 | 9/2007 | Lovett |
| 2008/0243624 A1 | 10/2008 | Perry et al. |
| 2010/0138780 A1 | 6/2010 | Marano |
| 2010/0299436 A1 | 11/2010 | Khalid |
| 2011/0191194 A1 | 8/2011 | Lutnick et al. |
| 2012/0123887 A1 | 5/2012 | Aihara |
| 2012/0232917 A1* | 9/2012 | Al-Khudairy .......... G06Q 10/02 705/2 |
| 2012/0254791 A1 | 10/2012 | Jackson |
| 2012/0284196 A1 | 11/2012 | Vilmos |
| 2013/0070093 A1 | 3/2013 | Rivera et al. |
| 2013/0197974 A1* | 8/2013 | Romanko ........ G06Q 10/06315 705/7.33 |
| 2013/0232017 A1* | 9/2013 | Nathanel ................ G06Q 20/20 705/16 |
| 2014/0089183 A1 | 3/2014 | Allen |
| 2014/0114775 A1 | 4/2014 | Cloin et al. |
| 2015/0324936 A1 | 11/2015 | Wilson |
| 2016/0078434 A1 | 3/2016 | Huxham |

OTHER PUBLICATIONS

U.S. Appl. No. 61/875,195, filed Sep. 9, 2013.
U.S. Appl. No. 61/969,630, filed Mar. 24, 2014.
U.S. Appl. No. 14/481,761, filed Sep. 9, 2014.
U.S. Appl. No. 14/535,902, filed Nov. 7, 2014.
Office Action in related U.S. Appl. No. 14/666,847 dated Aug. 24, 2015.
Notice of Allowance in related U.S. Appl. No. 14/666,847 dated Jan. 14, 2016.
International Preliminary Report for International Application No. PCT/US2014/064637 dated May 19, 2016.

* cited by examiner

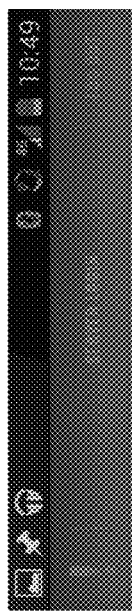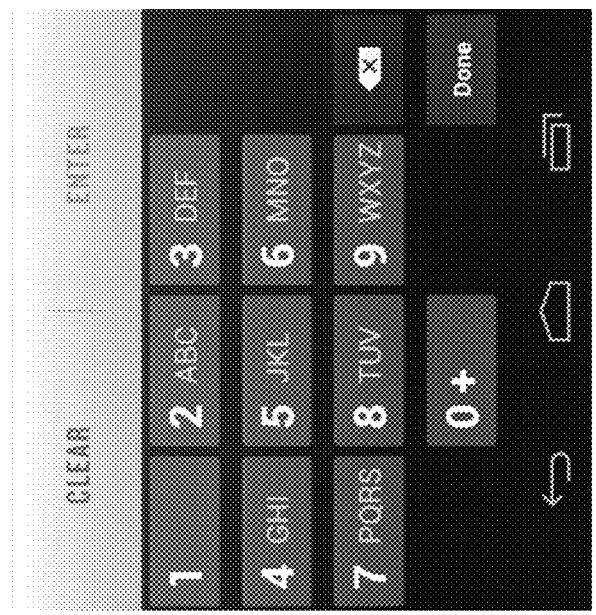
Fig. 5

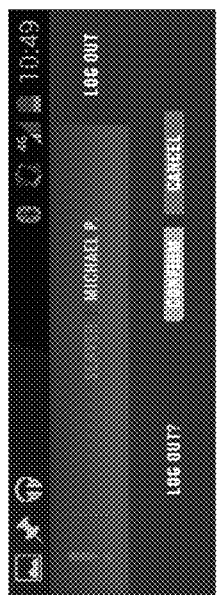
Fig. 31

SYSTEMS, APPARATUSES, AND METHODS FOR ORDERING ITEMS FROM AN ELECTRONIC MENU, AND SERVICING THEREOF

CROSS REFERENCE TO RELATED APPLICATIONS

This application is a continuation of U.S. patent application Ser. No. 15/098,871 which is a divisional of U.S. patent application Ser. No. 14/666,847 filed Mar. 24, 2015 (now U.S. Pat. No. 9,582,825 issued Feb. 28, 2017), which claims the benefit of U.S. Provisional Application No. 61/969,630 filed Mar. 24, 2014, which are hereby incorporated by reference in its entirety.

TECHNICAL FIELD

Certain example embodiments relate to techniques for the ordering of items using an electronic menu (eMenu) and/or the servicing of such orders for use in connection with electronic devices including, for example, tablets, phablets, smartphones, and/or other electronic devices.

BACKGROUND

Electronic menus (eMenus) are becoming more and more popular, especially as prices for electronic devices such as tablets, phablets, smartphones, and the like, continue to drop. Some restaurants have made moves to make their current physical menus available via custom applications (apps) that run on such electronic devices.

In addition to presenting an eMenu in electronic form, which a patron can use to place orders for menu items, aspects of interaction of a patron with other patrons and aspects of interaction between the patron and wait staff can be improved yielding better customer experiences and efficiencies.

BRIEF DESCRIPTION OF THE DRAWINGS

These and other features, aspects, and advantages of the instant invention will be further understood by review of the following detailed description of the exemplary embodiments when read in conjunction with the appended drawings, in which:

FIG. 5 illustrates an example wait staff login screen on a staff-operable device in accordance with one or more embodiments;

FIG. 9 illustrates another example listing of all active tables currently assigned to a particular staff member, as it would be displayed on the corresponding staff-operable device in accordance with certain exemplary embodiments;

FIG. 28 illustrates an example listing of ordered items displayed on a staff-operable device, in accordance with certain embodiments;

FIGS. 29-31 illustrate example listings of ordered items displayed on a staff-operable device, in accordance with certain embodiments.

DETAILED DESCRIPTION

Certain exemplary embodiments relate to systems and methods for facilitating ordering of items and/or of servicing such orders, for use in connection with electronic devices such as, for example, tablets, phablets, smartphones, and/or other electronic devices. Certain embodiments include techniques for synchronizing communication of information regarding the orders between patrons' devices, wait staff's devices, servers and other processing components. Such synchronization may yield ordering systems with improved efficiency and usability in various environments including, but not limited to, restaurants.

Figure 1:
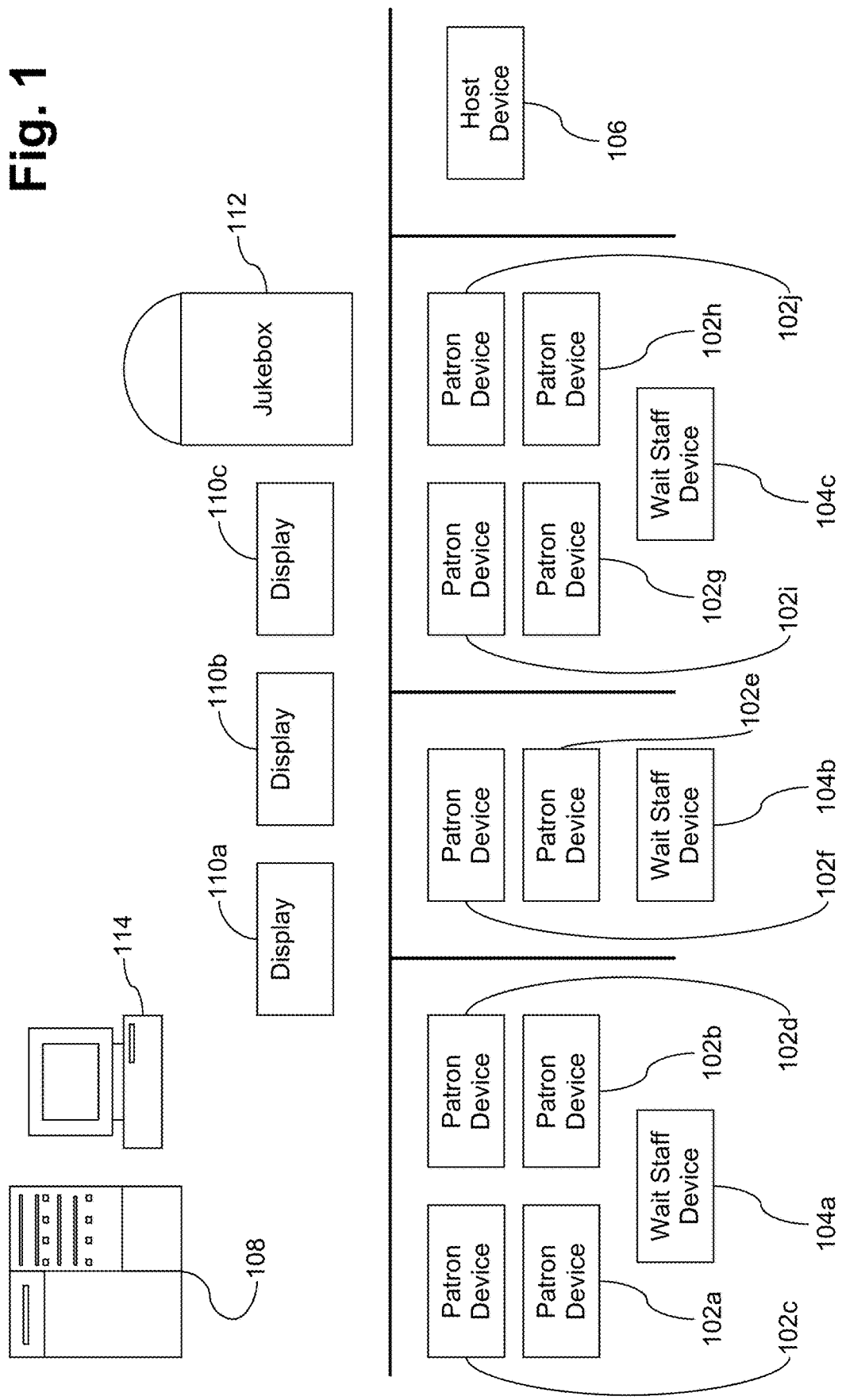
FIG. 1 is a block diagram showing elements that may exist in a restaurant for receiving orders for items and/or servicing such items, in accordance with certain exemplary embodiments.

Referring now more particularly to the drawings, FIG. 1 is a block diagram showing elements that may exist in a restaurant in which an eMenu is used for ordering items in accordance with certain exemplary embodiments. Many patron-operable devices (or "patron devices) 102a-102j are shown in FIG. 1. In the FIG. 1 example, the patron-operable devices 102a-102j are grouped such that each member in a party may have his or her own patron-operable device 102. As indicated above, the individual devices may be tablets, phablets, smartphones, and/or other electronic devices. The devices may be the same or different device types in different implementations, and they may be the patrons' own devices (e.g., onto which a suitable eMenu application has been downloaded and installed), devices provided by the restaurant and loaned to the patrons (e.g., onto which the same or similar suitable eMenu application has been downloaded and installed), or a mixture of the two. The patrons may use the patron-operable devices 102a-102j to browse an eMenu made in accordance with, for example, one or more techniques described in U.S. Provisional Patent Application No. 61/901,400 filed on Nov. 7, 2013, and U.S. patent application Ser. No. 14/535,902 filed on Nov. 7, 2014 which is hereby incorporated herein by reference in its entirety. In certain exemplary embodiments, placing orders, calling a staff member (e.g., with a predefined message such as, fore example, "ready to order," "please bring refills," "napkins needed", "check please", etc.; a custom message; and/or as a general matter without a specific message), playing single or multi-player games (e.g., table-wide, restaurant-wide, and/or broader-scale games such as trivia), controlling a television or other display provided at table or elsewhere, interacting with a jukebox, and/or interacting with other entertainment offerings. Patron-operable devices may be distributed to patrons prior to their being seated for use in the location, e.g., for ordering drinks from a bar, playing games, receiving notifications when a table is ready, checking on estimated wait times and/or location in a queue, etc.

Wait staff who serve the patrons may have their own wait staff devices 104a-104c. Wait staff operable devices 104a-104c may be used to place orders on behalf of patrons, confirm patrons' orders, etc. A host-operable device 106, which may run the same or similar application as the wait staff operable devices 104a-104c, also may be provided. These devices may also provide waitlist information, generate estimated wait times, etc.

In certain exemplary embodiments, the wait staff operable devices 104a-104c and/or the host-operable device 106 may be phablets or smaller tablets, e.g., to facilitate mobility, whereas the patron-operable devices 102a-102j may be larger tablets or the like.

A local server 108 is provided in the location, e.g., to provide content caching (e.g., useful in the administration of local games such as trivia), coordination of media output to the displays 110a-110c, distribution of newly downloaded music to the jukebox 112, generate backups of orders and/or other onsite information, etc. The local server 108 thus may have a connection to the Internet and/or another outside network.

In addition to or in place of the local server 108, certain exemplary embodiments may incorporate a management computer 114. The management computer 114 and/or the local server 108 may receive orders from the wait staff operable devices 104a-104c and/or the patron-operable devices 102a-102j (e.g., depending on the implementation in terms of who is allowed to place orders). It also may relay orders to kitchen staff, manage notifications to wait staff when orders are ready, generate bills, etc. The management computer 114 may also administer the waitlist, potentially keeping track of when parties are seated, how long parties remain seated on average and/or in accordance with a general rule defined by the location and/or an outside party, etc. The host-operable device 106, the wait staff operable devices 104a-104c, and/or the patron-operable devices 102a-102j may be able to access this waitlist information, e.g., as indicated above. The local server 108 may backup this and/or other related information in certain exemplary embodiments.

The displays 110a-110c may be televisions or other professional displays and, as such, may receive video feeds from cable boxes, satellite receivers, streaming network sources over IP, and/or the like. As alluded to above, the displays 110a-110c may be managed by the local server 108 and/or the management computer 114.

The jukebox 112 may be a digital downloading jukebox or the like. See, for example, U.S. Publication No. 2013/0070093, the entire contents of which are hereby incorporated herein by reference. As alluded to above, the jukebox 112 may be interacted with and/or at least partially controlled by host-operable device 106, the wait staff operable devices 104a-104c, and/or the patron-operable devices 102a-102j.

Figure 2:
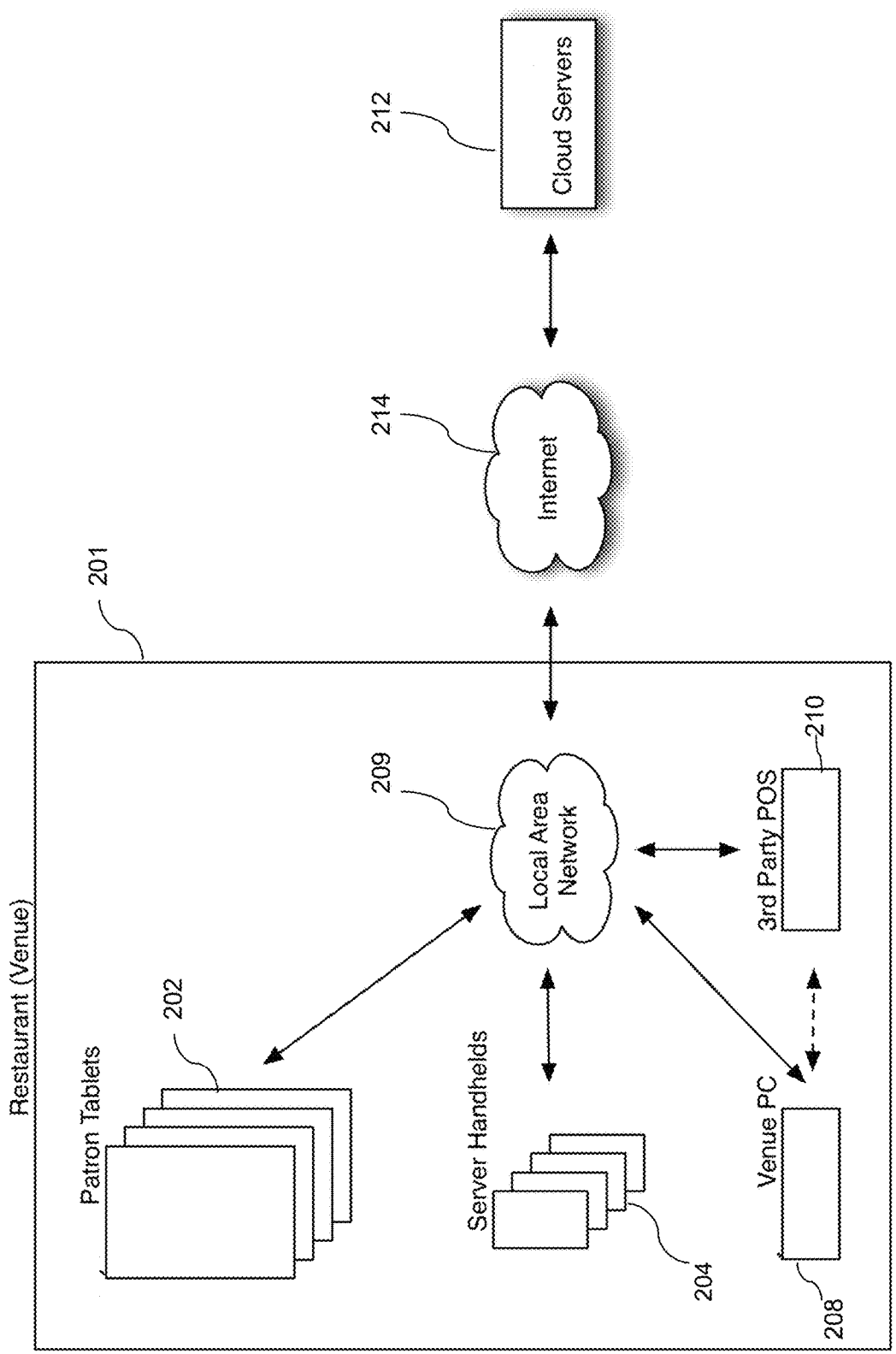
FIG. 2 is a block diagram showing elements that may exist in a restaurant for receiving orders for items and/or servicing such items, in accordance with certain exemplary embodiments.

FIG. 2 illustrates another example of a system that may be deployed in a restaurant or other environment in order to facilitate the placement of orders for various items by patrons (e.g., customers, clients, guests who may place orders for items) and the servicing of such orders. The system in FIG. 2 is illustrated in the context of a restaurant 201. The items ordered could be food items, drinks, or other goods or services item that may be ordered by a patron. For example, in some embodiments, the items can also include souvenirs or other items available for purchase, music, audio and/or video items to be displayed to the patron ordering such items, or an additional goods or services item that is associated with one or more other ordered items. The system for facilitating of ordering items and/or servicing of such orders include one or more devices at the venue (e.g., restaurant) 201, and may also include one or more cloud servers 212 communicatively connected to one or more devices at venue 201 through an external network 214, such as, for example, the Internet. In some embodiments, external network 214 may include a corporate wide area network. Cloud servers 212 may include one or more computers located in a central location or distributed over multiple locations but communicatively connected to the venue 201, directly or indirectly, by the external network 214.

The venue 201 may include a plurality of patron-operable devices 202 (e.g., tablets, phablets, smartphones, etc., operated by a patron), a plurality of wait staff-operable devices (or "staff devices") 204 (e.g., tablets, phablets, smartphones, etc., operated by a server or other member of the wait staff), a venue computer 208 (e.g., one or more PCs, server computers) and, optionally, a separate point of sale terminal 210. Venue 201 may include, or may be included in, an environment such as that described with respect to FIG. 1.

Patron-operable devices 202 and wait staff-operable device (also referred to as staff-operable device or staff device) 204 may include handheld electronic devices such as, for example, tablets, phablets, smartphones and/or other electronic devices. Patron-operable devices 202 may include devices provided either by the patron (e.g., patron's own personal tablet or smartphone) or by the venue (e.g., a tablet that is venue-owned and assigned for use to a patron during his presence at or near the venue). Application programs that at least facilitate ordering of items execute on patron-operable devices 202. The application programs executing on patron-operable devices may also include, but are not limited to, functionality for, one or more of, dynamically updating and/or reconfiguring the electronic menu, communication with wait staff-operable devices and/or other patron-operable device, obtaining and displaying advertisements, obtaining and displaying other information (e.g., information about the venue, general information such as weather, sports/current event news etc., information about some of the ordered items or about one or more items in the electronic menu, etc.), and/or facilitating interaction with other systems (e.g., jukebox 112 show in FIG. 1) at the venue. Staff-operable devices 204 may include either staff-provided handheld electronic devices (e.g., wait staff member's own personal tablet or smartphone) and/or venue provided handheld electronic devices (e.g., a tablet that is venue-owned and assigned for use to a wait staff member during his shift). Staff-operable devices 204 execute application programs that facilitate the servicing of orders that are initiated by the patron-operable devices 202. The application programs executing on staff-operable devices may also include, but are not limited to, functionality for, one or more of, dynamically updating and/or reconfiguring the electronic menu, communication with patron-operable devices and/or other staff-operable device, and/or facilitating interaction with other systems (e.g., jukebox 112 show in FIG. 1) at the venue.

Venue computer 208 may include one or more servers and/or personal computers. Venue computer 208 may facilitate communication and/or synchronization between itself, patron-operable devices 202 and staff-operable devices 204. Venue computer 208 may provide for storing and/or distributing the eMenus and/or other information to the patron-operable devices 202 and staff-operable devices 204. Venue computer 208 may also facilitate the communication of ordered items and/or other information associated with the ordering to staff-operable devices 204 and/or locations where servicing of ordered items is performed. In some embodiments venue computer 208 may be included in another device such as, for example, jukebox 112.

At venue 201, one or more local networks 209, for example, such as, a WIFI or other wireless local area network (e.g., Bluetooth, near field communication etc.), may be configured to provide interconnectivity between the devices. In some embodiments, one or more of patron-operable devices 202, staff-operable devices 204 may communicate between one another using a second local network connection, such as, for example, Bluetooth or near field communication. While in some embodiments, direct communication between similarly configured (e.g., assigned to the same table) patron-operable devices and also between a patron-operable device and a staff-operable device assigned to the same table is enabled, in some embodiments, all communications between two patron-operable devices assigned to the same table, the communication between a staff-operable device and a patron-operable device assigned to the same table and/or the communication between staff-operable devices are via one or more central nodes, such as, for example, the venue computer. For communication between devices that are located at the venue 201, the message exchange may be facilitated by only the one or more local networks 209. Any messages from a component located in venue 201 to an external location, including, for example, communication between venue computer 208 and cloud servers 212 is via external network 214.

In some embodiments, venue 201 includes a point of sale (POS) system 210. POS system may include any type of POS, such as, for example, a third-party provided POS system. In some embodiments, POS system 210 may be a separate device including a computer, and in some other embodiments, the POS system may include venue computer 208. POS system 210 includes application programs to keep track of costs of various ordered items, prepare billing statements, prepare receipts, accept/process payments, etc.

Figure 3:
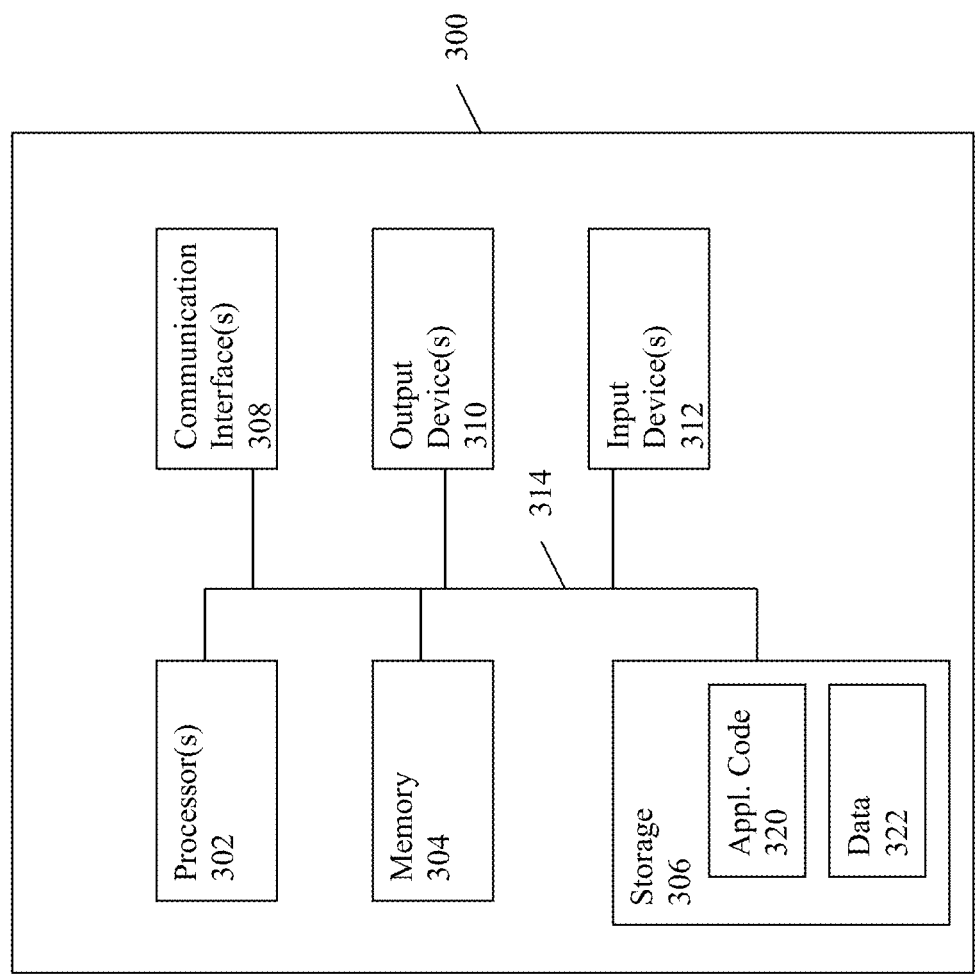
FIG. 3 is a block diagram of an exemplary computer that may be included in one or more embodiments.

FIG. 3 is a block diagram of an exemplary computer 300 that may be included in one or more embodiments. Computer 300 includes at least one processor 302, memory 304, storage 306, communication interface(s) 308, output device(s) 310, input device(s) 312, and communication infrastructure 314. Each of patron-operable devices 202, staff operable devices 204, venue computer 208, POS system 209, and cloud server 212 may include a suitably configured computer 300.

Processor(s) 302 may include one or more of a central processing unit, digital signal processor, ASIC, graphic processing unit, and/or other processor. Processor(s) operate to execute one or more programs included in, for example, application code 320. Programs included in application code 320 may include one or more of programs to enable ordering of items by patrons at venue 201, programs to enable servicing of orders by wait staff at venue 201, and/or programs to enable synchronization between devices in the system for ordering and servicing of orders at venue 201. Application code 320 may also include programs for obtaining and maintaining data 322 (e.g., data regarding menu items that can be ordered, including price, availability, description, associated images, and related information), programs for billing and charging patrons, etc.

Memory 304 may include volatile memory such as, for example, random access memory (RAM), and may include portions of application code 320 and/or data 322 during execution of programs by processor(s) 302. Storage 306 includes non-volatile memory such as, for example, magnetic and/or optical disk storage, and FLASH storage. Application code 320 and/or data 322 may be stored in storage 306.

Communication interface(s) 308 includes one or more of a network communication interface such as a wireless local area network interface, a Bluetooth interface, and/or near field communication interface. Communication interface(s) 308 may provide for computer 300 to communicate with another computer located locally at the same venue or remotely to exchange messages.

Output device(s) 310 may include one or more of, for example, a display (e.g., screen, touchscreen, monitor, etc.) and printer. Input device(s) 312 may include one or more of, for example, keyboard, mouse, touchpad, touchscreen, etc.

Communication infrastructure 314 provides for communication between components within computer 300, such as, for example, between components 302-312.

Figure 4A:
FIGS. 4A, 4B, and 4C illustrate a flowchart for a technique for ordering items and servicing such orders in accordance with certain exemplary embodiments.
Figure 4B:
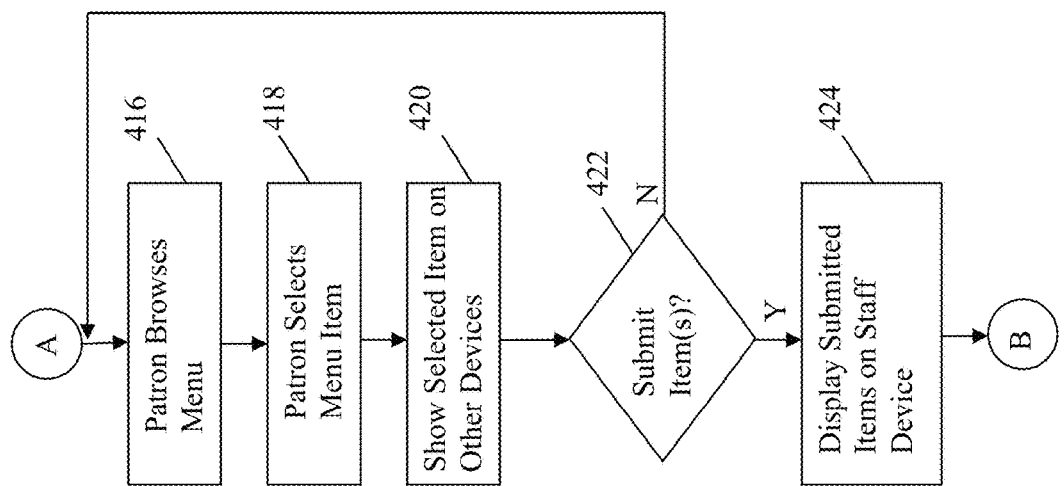
Figure 4C:
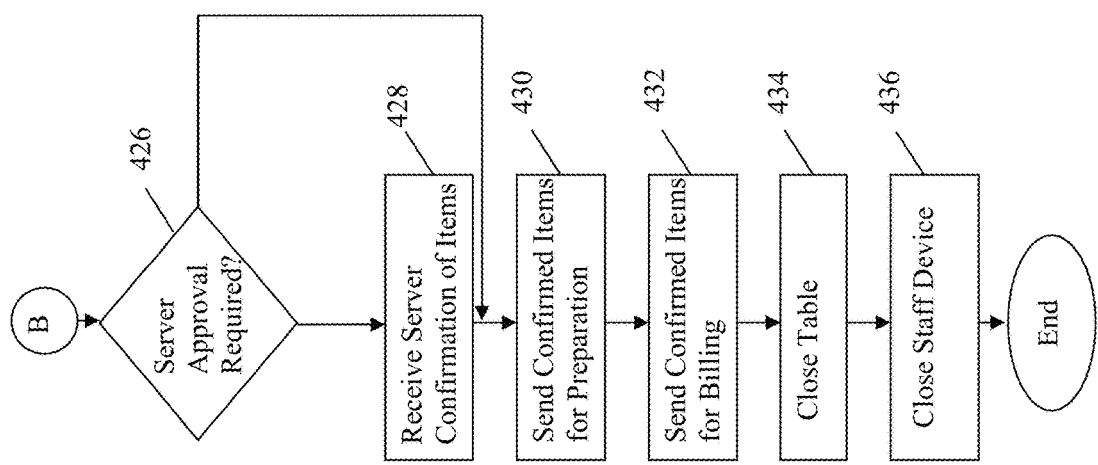

FIGS. 4A, 4B and 4C illustrate a flowchart 400 for a technique for ordering items and servicing such orders in accordance with certain exemplary embodiments. The technique illustrated in the flowchart comprises operations 402-436, including operations performed by patrons, wait staff (including hostess), venue computer, patron-operable devices, staff-operable devices, POS system, and cloud or other servers. It will be understood that, in some embodiments, ordering and/or servicing of such orders may be performed in accordance with the teachings in this specification by performing operations 402-436 in a different order than that shown, by excluding one or more of the operations 402-436, and/or by including one of more additional operations than that shown.

At operation 402, a process for ordering items and servicing such orders is started. As described below, ordering items and the servicing of such orders according to embodiments, involve actions performed by one or more patrons on patron-operable devices and one or more wait staff members on staff-operable devices, and may also include other processing entities and users.

At operation 404 one or more patron-operable devices 202, one or more staff-operable devices 204 and venue computer 208 are initialized and/or provided with the initial configuration to commence operations to enable ordering of items and/or for servicing such orders, for example, in a venue such as, but not limited to, a restaurant. Operation 404 may be performed, for example, before the restaurant opens for lunch or dinner.

Initializing the venue computer 208 may include obtaining and/or updating information for providing menu information, information regarding number of tables that may be assigned at least one patron-operable device, information regarding wait staff members available etc. Initializing a patron-operable device 202 or a staff-operable device 204 may include enabling that device to communicate with the rest of the ordering and servicing system by at least communicating with the venue computer 208. In some embodiments, some or all of the menu information (e.g., information regarding items that may be ordered, and other associated information) may be stored on the patron-operable device 202 or on the staff-operable device 204 during initialization for use later during the ordering and/or servicing activity. In other embodiments, the storing of such information on devices 202 and/or 204 is not performed during initialization, and the information is obtained during the ordering and/or servicing activity from the venue computer 208 and/or cloud servers 212 via one or more of networks 209 and 214. The performing of the initial configuration upon patron-operable devices and/or staff-operable devices may include downloading of an application to a personal tablet, smartphone or like device provided by the patron and/or staff. For example, a patron or a member of the wait staff may upon entering the venue, using a browser on their own smartphone may, by visiting a predetermined website or scanning a QR code, download the relevant app or application program. The downloaded application would then perform operations described herein as those performed by the patron-operable device or the staff-operable device.

At operation 406, a particular staff operable device 204 is activated by assigning it to a wait staff member. The assigning may include entering, either on the staff operable device 204 or on the venue computer 208, a unique code identifying the wait staff member. The association between the wait staff member, as identified by the entered unique code, and the particular staff-operable device 204 may be recorded at venue computer 208. The venue computer 208, based upon the unique code, may access previously stored information about the wait staff member. The accessed previously stored information about staff members may include general information such as the name and/or picture of the staff member, table preferences and/or preferred assignments, working hours, etc.

According to an embodiment, a wait staff member is assigned to a staff-operable device when the wait staff member logs into that staff-operable device with a 1-12 digit wait staff member identification number. The staff member's identification number may be the same number used to log into the restaurant's POS, and/or used for timecard purposes etc. The entered staff member identification number may be authenticated based on data, for example, that is stored in the venue computer, cloud servers, or other server.

Figure 6:
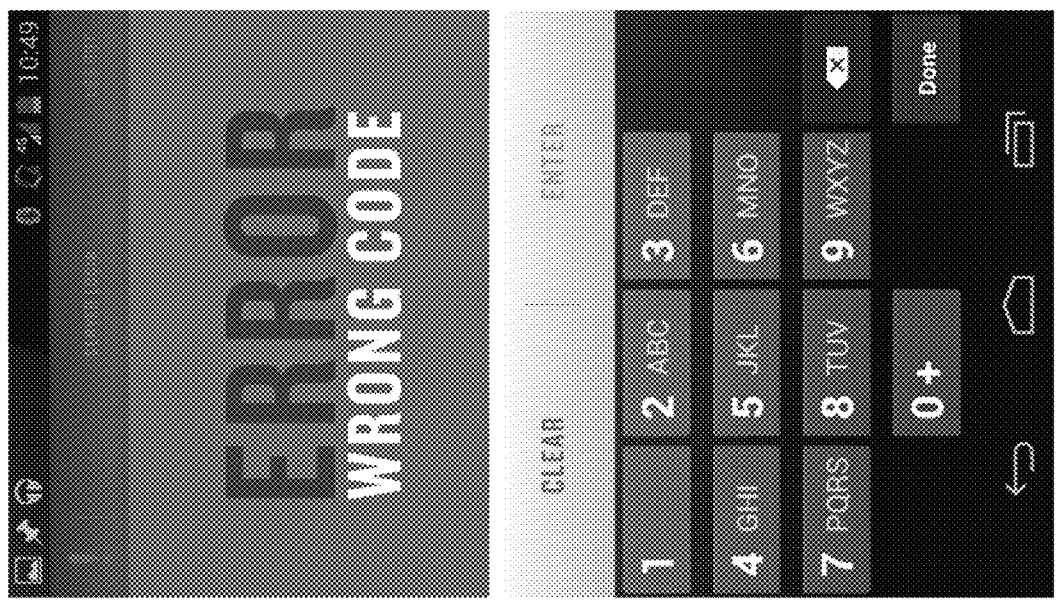
FIG. 6 illustrates an example wait staff login error screen on a staff-operable device in accordance with one or more embodiments.

According to an embodiment, a 10 digit login screen appears (e.g., 0-9, like a phone dialer or ATM login). The screen may include an "ENTER" and a "CANCEL" button. "CANCEL" clears any numbers entered. The wait staff member may enter his individual identification number and tap "ENTER". If the identification number is authenticated (e.g., the entered identification number matches one in a stored list for that restaurant) then a screen for selecting a table may be displayed. FIG. 5 illustrates an example wait staff login screen on a staff-operable device. If authorization fails, an error message may be displayed, e.g., "Sorry, that code is not recognized. Please try again," and return the user to the identification number entry screen. FIG. 6 illustrates an example wait staff login error screen on a staff-operable device in accordance with one or more embodiments.

At operation 408, a particular patron-operable device 202 is activated by assigning it to a table. For example, when a patron is seated at a table, he or she may be handed the patron-operable device 202. According to an embodiment, patron-operable device 202 is assigned to a table by selecting and/or entering a table number on the device 202. In other embodiments, the assignment may be selected and/or entered by input at the venue computer 208 or a staff-operable device 204. In this manner, a plurality of patron-operable devices 202 may be assigned to one table by using a table number or other such predetermined identifier for that table. It will be understood that although the description herein associates a predetermined identifier with a table, the predetermined identifier is used to identify a group of patrons that are to be served as one group and members of that group may be at none (i.e., not physically seated at a table), one or more tables in the restaurant. For example, if three patrons are seated at table 10, then three patron-operable devices 202 (e.g., patron tablets 1, 2 and 3) may be assigned to table 10. The respective assignments are recorded at venue computer 208 (e.g., venue computer may record in memory or storage that: patron tablet 1 is assigned table 10; patron tablet 2 is assigned table 10; and patron tablet 3 is assigned table 10).

In some embodiments, a hostess seating restaurant patrons at a table may hand each patron a patron-operable device. The patron-operable device may be assigned to that table via a user interface (UI) on each patron-operable device. After the assignment is made, at least some embodiments may not permit changing of the assignment by a patron. Patrons may begin browsing menu items and ordering from devices immediately, but a wait staff member's personal information (e.g., name) is not displayed on the patron-operable devices until the wait staff member "starts" that table.

It will be understood that any number of patron-operable devices may be assigned to a table at a given time, and that any number of tables may have assigned patron-operable devices at a given time. In some embodiments, a particular patron-operable device is assigned, at any given time, to only a single table.

At operation 410, a list of tables currently having at least one active patron-operable device 202 is displayed on one or more of the active staff-operable devices 204 and/or venue computer 208. Any wait staff member may bring up a list of all tables on his assigned staff-operable device. In some embodiments, the list may only be displayed to selected active staff operable devices, such as, for example, those assigned to wait staff members who are yet not assigned a configured threshold number of tables and/or those staff-operable devices that have a selectable option indicating that the wait staff member is available to handle a new table. In some embodiments, the determination as to whether to display the list on a particular device 204 may be based on the total number of patron-operable devices currently assigned to tables associated with the particular device.

The list may indicate a status of each table as to whether a wait staff member has started that table and has not yet ended the table, patron-operable devices have been assigned to the table but a wait staff member has not started that table, or whether a the table's check is paid in full, but the wait staff member has not yet ended the table. If no patron-operable devices are assigned to a table (which is the case after a wait staff member ends a table) then the table may not display in the list. A wait staff member may start a table by selecting it from this list of tables.

Figure 7:
FIG. 7 illustrates a list of all tables with assigned patron-operable devices as shown on a staff-operable device in accordance with one or more embodiments.

The list may show only the tables that are not currently assigned to a wait staff member, or may show all or some tables while separately identifying the tables yet unassigned to a wait staff member. FIG. 7 illustrates a list of all tables with assigned patron-operable devices as shown on a staff-operable device. As shown, two tables are listed as unclaimed. Already assigned tables are shown with the currently assigned wait staff member name.

At operation 412, a wait staff member is assigned to a table (e.g., a wait staff member "claims" the table). A particular wait staff member may be assigned to a table by entering and/or selecting the table on the corresponding staff-operable device 204. Alternatively, the assignment may be made by associating a particular wait staff member or corresponding staff-operable device and a table by providing input at the venue computer.

According to some embodiments, a wait staff member who is currently logged in to a staff-operable device, can "start" (i.e. be assigned to the table) one or more tables. When the wait staff member is aware that a new table has been seated, he may enter and/or select the table number. FIG. 7 illustrates a "start" option next to two of the tables listed as unclaimed. The purpose of "starting" the table is to associate the patron-operable devices that are assigned to that table to the relevant staff-operable device.

In some embodiments, when the table is started the wait staff member's information (e.g., name, picture, etc.) may be displayed on all patron-operable devices assigned to that table. Any orders that have already been placed by that table (e.g., via the patron-operable devices currently assigned to that table) are displayed in the staff-operable device.

Figure 8:
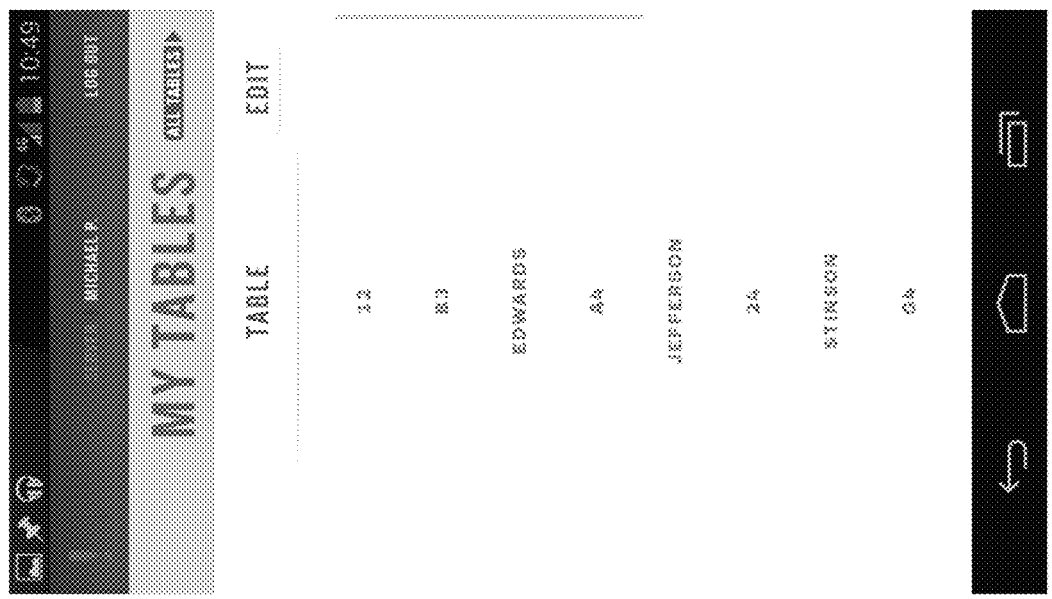
FIG. 8 illustrates a listing of all active tables currently assigned to a particular staff member, as it would be displayed on the corresponding staff-operable device in accordance with certain exemplary embodiments.
Figure 9:
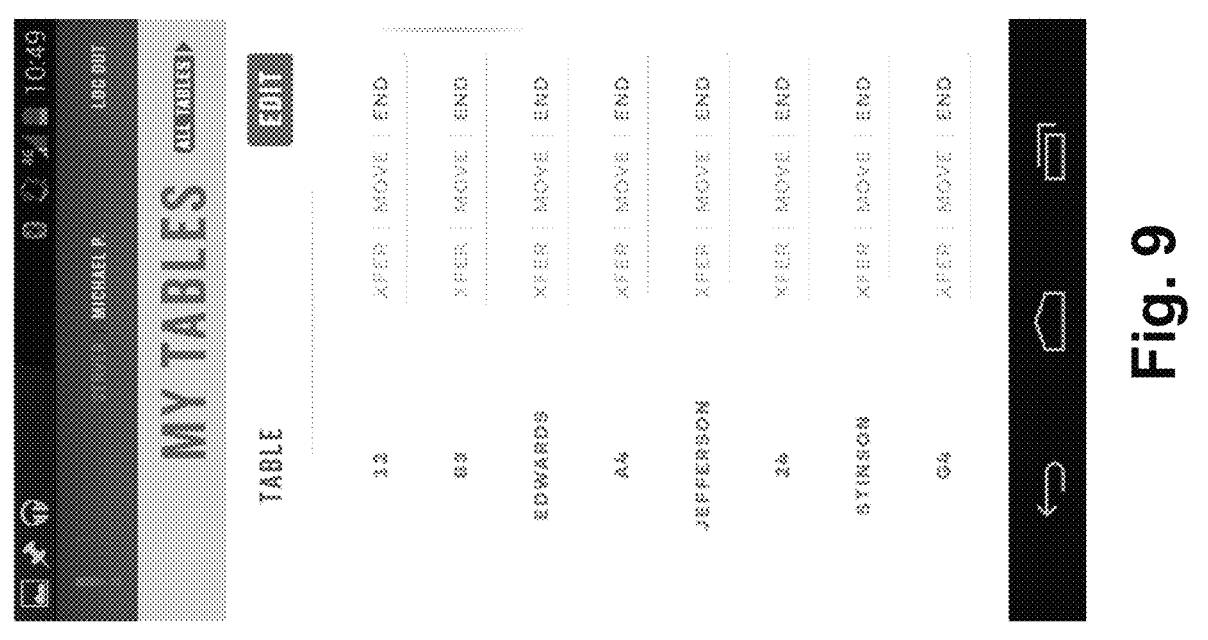

In some embodiments, a wait staff member is able to bring up a screen listing all his active tables (i.e. all tables he has started but not yet ended). FIGS. 8 and 9 illustrate example listings of all active tables currently assigned to a particular staff member, as it would be displayed on the corresponding staff-operable device. As shown, for example, in FIG. 9, each table number (displayed, for example, by a number or text string) may have corresponding buttons to perform actions, such as, for example, "END", "TRANSFER" or "MOVE" for each table assigned to him. The list may be presented in the order the wait staff member started the tables; i.e. oldest table on top and newest table on the bottom. When a wait staff member ends a table, it is removed from the list.

Tapping on the table number in his active tables list may take the wait staff member to a screen where all menu items ordered at the corresponding table, and status for each ordered from that table are displayed. In some embodiments, other information, such as, for example, the number of patron-operated devices assigned to the table, and whether or not each patron-operated device is a venue owned device may be displayed in the same screen or in a different screen.

Figure 10:
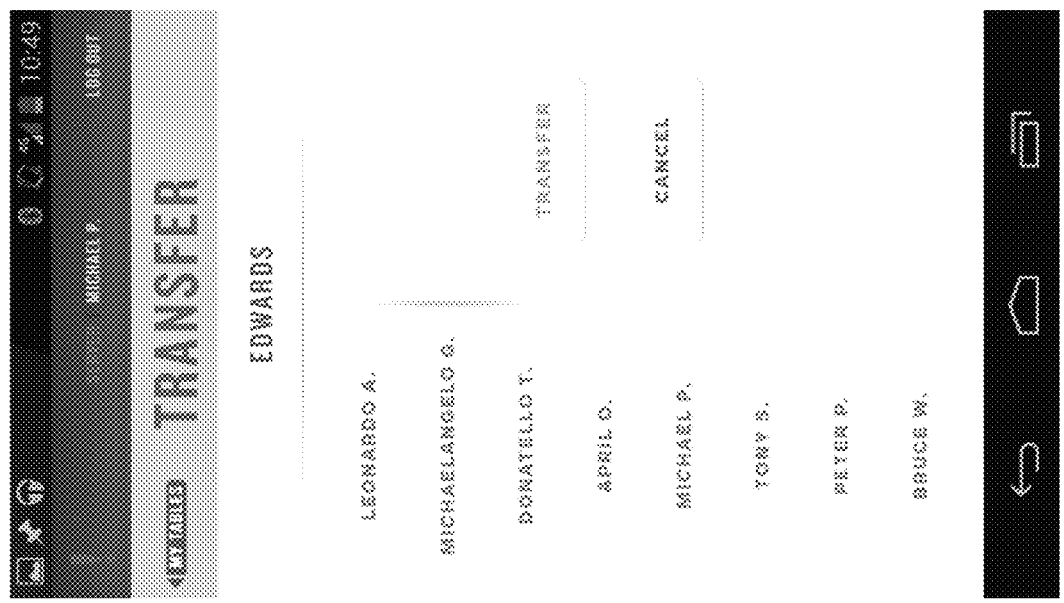
FIG. 10 illustrates a screen on a staff-operable device during a transfer operation, in accordance with certain exemplary embodiments.

Wait staff may occasionally need to transfer tables between themselves, for example, if an employee goes on break or ends their shift. Thus, some embodiments provide for a wait staff member to transfer a table currently assigned to him to another wait staff member. This may be performed by the first wait staff member (who has the table currently assigned) selecting the table to be transferred from a list of his active tables displayed in his staff-operable device, and then selecting a second wait staff member from a list of all active wait staff member (i.e. wait staff who have a currently assigned staff-operable device) also displayed on his staff-operable device. FIG. 9 illustrates a screen with a list of the tables of a particular server, and a set of selectable choices to effect a transfer, move or end the table, being associated with each table. As the listing of tables in FIG. 9 indicates each table may be identified by a number, an alpha numeric code, or an identifier such as a name of a person. If server Michael P. wants to transfer one of the listed tables to another server, then he can select "transfer" for the entry corresponding to that table. FIG. 10 illustrates a screen on a staff-operable device during a transfer operation, in accordance with an embodiment. FIG. 10 illustrates a screen after the server Michael P. has chosen to initiate a transfer of the table identified as Edwards. As shown in FIG. 10, a listing of active servers is displayed together with buttons or other input to confirm or cancel the transfer. Server Michael P. can select either his name (e.g., in the event that he wants to transfer table Edwards back to himself) or a name of another wait staff member from the list displayed on the left of the screen, in order to transfer the table identified as Edwards.

When a table is transferred from a first wait staff member to a second wait staff member, the following may occur. The wait staff member name, picture etc. on the patron-operable devices assigned to that table changes to show the new wait staff member information, the table is removed from the first wait staff member's active tables list, and is newly displayed in the second wait staff member's active tables list, all order data and active alerts etc. for the table are now displayed on the new wait staff member's staff-operable device.

In some embodiments, the transfer may be initiated before the new wait staff member has a staff-operable device assigned to him. For example, the new wait staff member may be selected from a list of all wait staff members. In this case, even after the transfer is selected from the list of the first staff member's active tables, the table remains in the first staff member's active list until the new wait staff member logs into his staff-operable device, and thereafter having the transfer performed and/or completed.

Figure 11:
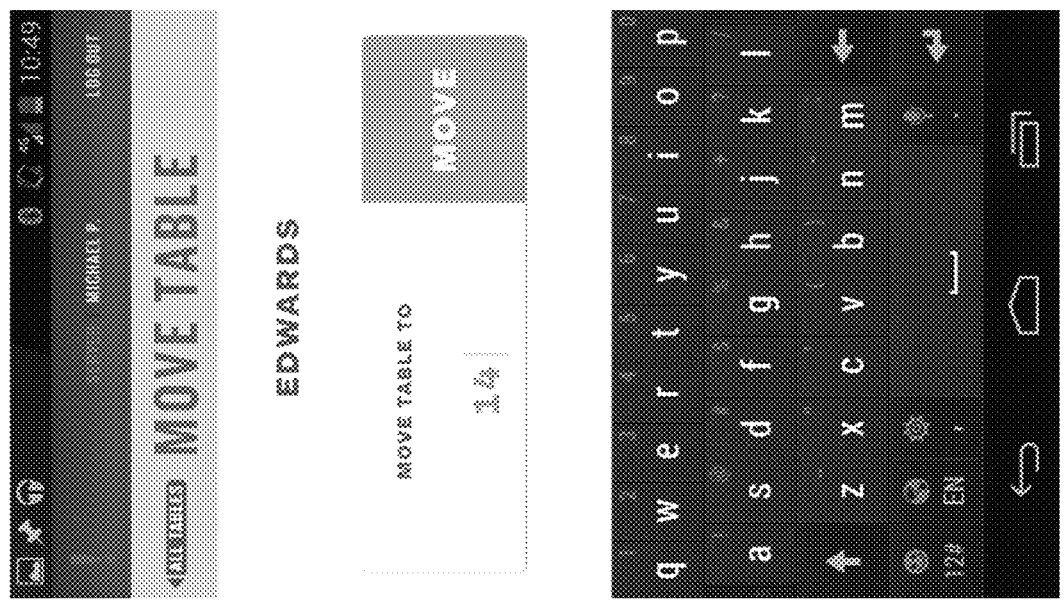
FIG. 11 illustrates a screen on a staff-operable device during a move operation, in accordance with certain exemplary embodiments.

Occasionally, wait staff members may want to move a party from one table to another, or from the bar area to a table. When such a move is made, all order history for the party being moved should remain even though the table number/name is changed. According to an embodiment, a wait staff member may move a party from an old table to a new table by selecting the old table from the list of his active tables and then indicating the new table. FIG. 11 illustrates a screen displayed on a staff-operable device during a move operation, in accordance with an embodiment. The new table may be selected from a list of tables or by manually inputting an identifier for the new table. Lists, such as the wait staff member's active tables list and the overall table list may be updated to reflect the newly activated table.

Figure 12:
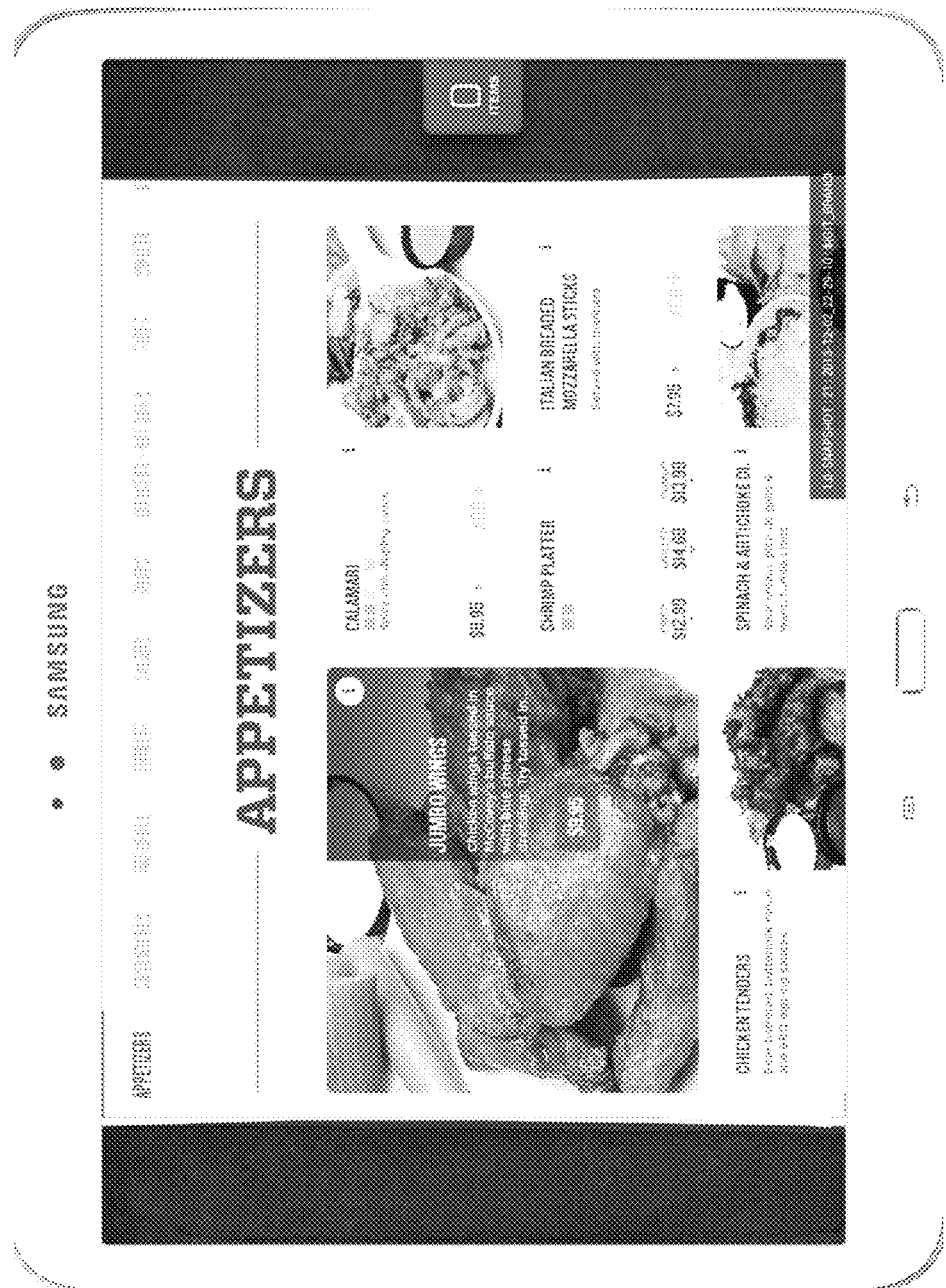
FIG. 12 illustrates an example menu displayed on a patron-operable device in accordance with certain embodiments.

At operation 414 a menu is displayed on the one or more patron-operable devices 202. The information for the displayed menu may be obtained real-time from the venue computer 208 or from cloud servers 212, or the information may be pre-stored (e.g., during initialization on device 202). In some embodiments, the menu information is loaded to the device 202 upon initialization, and is updated either periodically or continuously with changes to the menu. FIG. 12 illustrates an example menu displayed on a patron-operable device in accordance with certain embodiments. As shown in FIG. 12, the menu may be presented so that the patron can freely select from a set of categories of items (e.g., appetizers, sandwiches, barbeque, entrees, salads, soups, burgers and hotdogs, sides, etc.), and for a selected category to display a scrollable display of various items with an image, a name, a price, a description, a summary of choices for each item etc.

At operation 416, the patron may browse the displayed menu. Browsing the menu may include browsing through multiple pages, invoking subscreens for detailed information about menu items, freely selecting (e.g., going back and forth) between different categories (e.g., appetizers, entrees, etc.), and the like.

Figure 13:
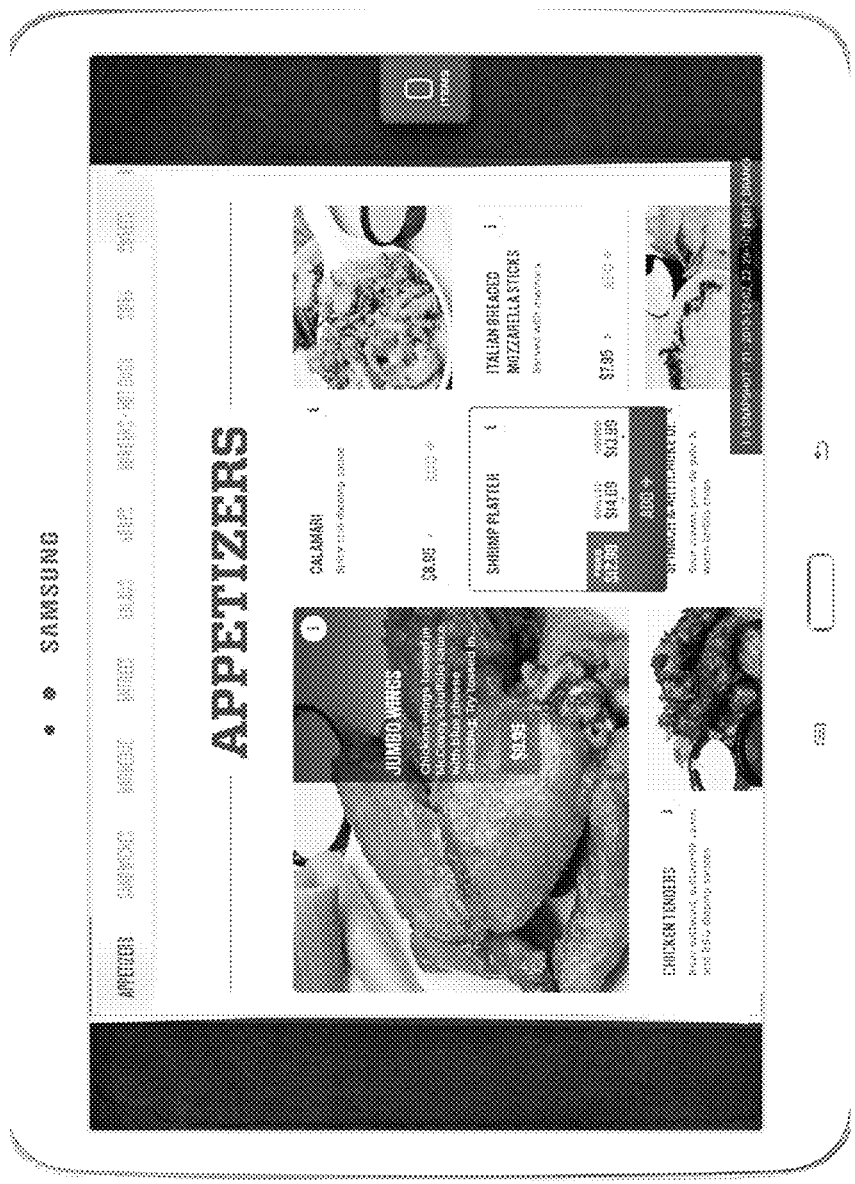
FIG. 13 illustrates an example screen of a patron-operable device when items are selected, in accordance with certain embodiments.
Figure 14:
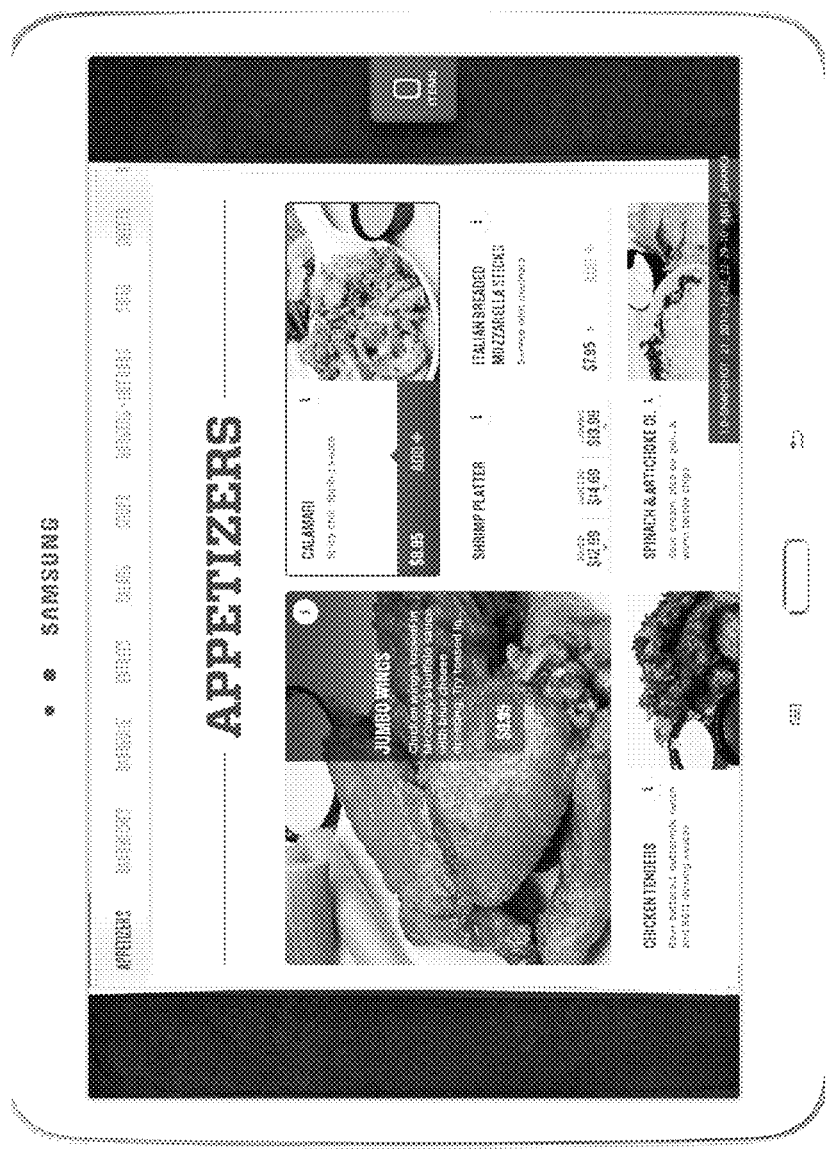
FIG. 14 illustrates another example screen of a patron-operable device when items are selected, in accordance with certain embodiments.

At operation 418, the patron may select an item. Selecting an item may include selecting the item by touching the portion of the display where that item is displayed, by using a checkbox, or by other method of input. FIGS. 13 and 14 illustrate example screens of the patron-operable device when items are selected, in accordance with certain embodiments.

Figure 15:
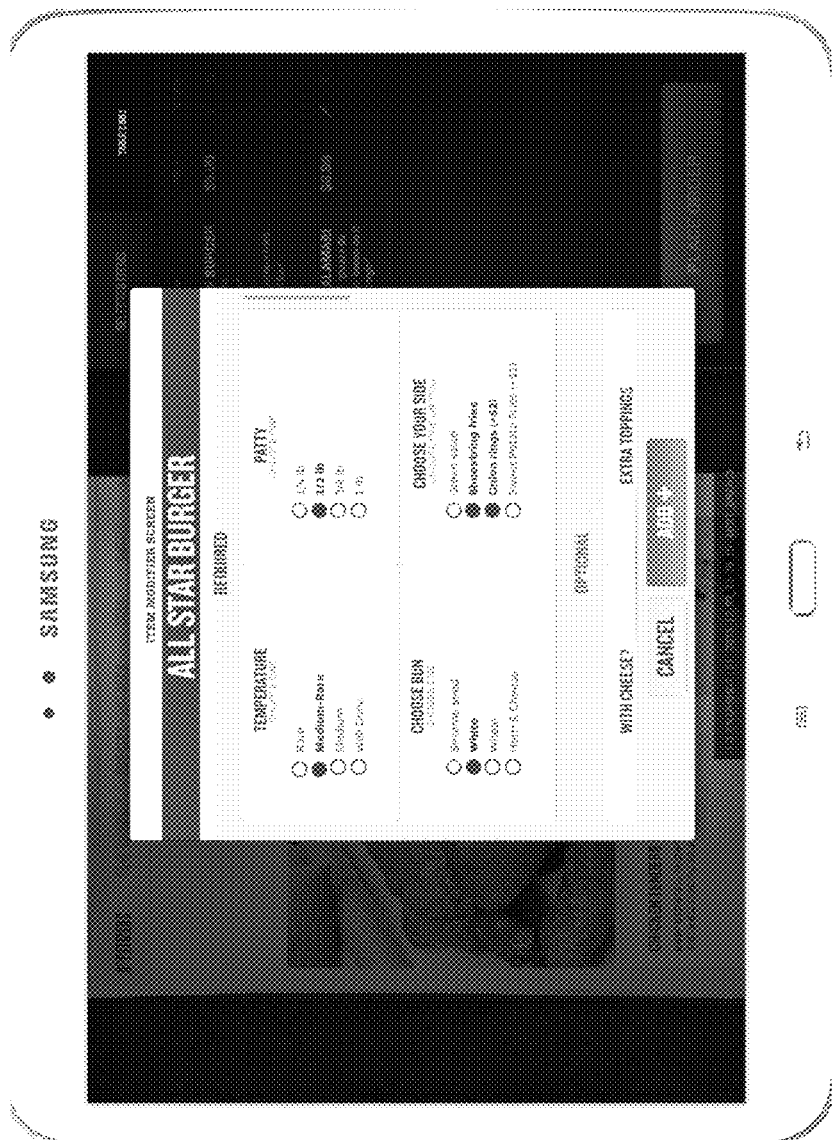
FIG. 15 illustrates a screen using which a patron can modify a selected order item in accordance with certain embodiments.
Figure 16:
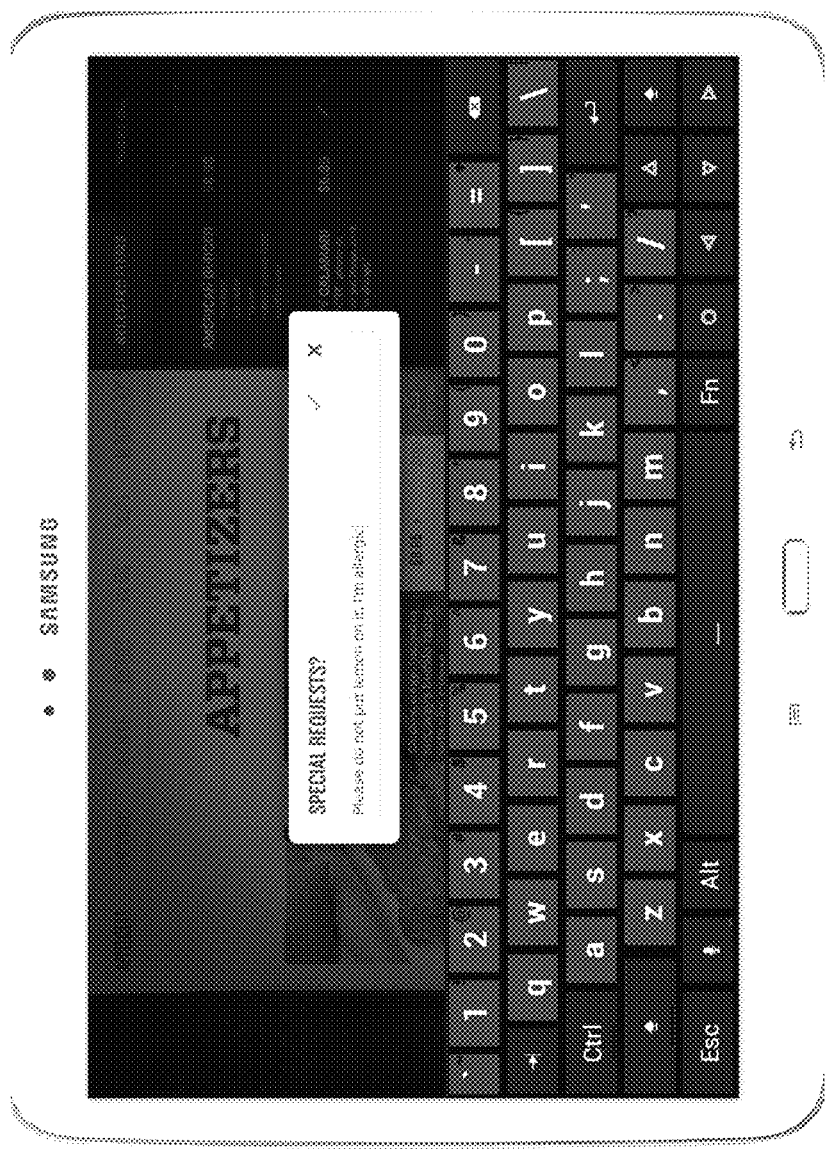
FIG. 16 illustrates a screen using which a patron can enter a comment regarding a selected order item, in accordance with certain embodiments.

Selecting an item may also include specifying related serving information, such as, for example, the number of portions (e.g., two orders of the item), and preparation preferences (e.g., well done or rare, spicy or mild etc.). The patron may, optionally, indicate modifications for the menu item. FIG. 15 illustrates a screen using which a patron can modify a selected order item in accordance with certain embodiments. Some embodiments provide for the patron to add a free form (e.g., text and special characters) note to any selected item. In some embodiments, the free form note may include audio and/or video provided or recorded by the patron. FIG. 16 illustrates a screen using which a patron can enter a comment regarding a selected order item, in accordance with certain embodiments.

Figure 17:
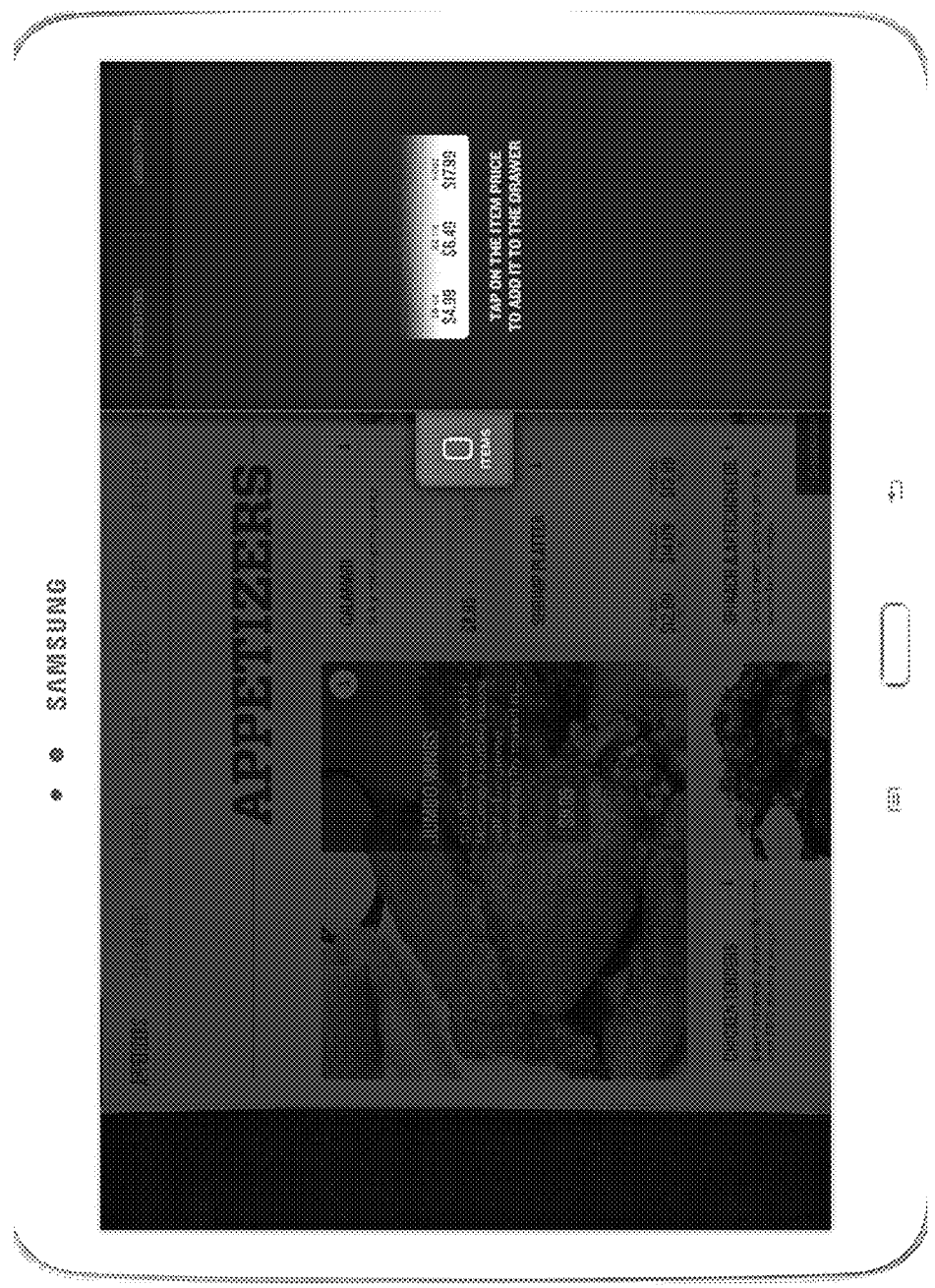
FIG. 17 illustrates the display of a menu item modification screen before the item is added to the virtual drawer, in accordance with certain embodiments.

The patron may indicate the selection of an item by placing the corresponding menu item into a virtual "drawer". According to some embodiments, as shown in FIGS. 13 and 14, patrons at a table can add any item on the menu to the table's virtual drawer by tapping a plus sign ("+") on every menu item or the 'order' button on every menu item detail page (note that not every menu item will have a menu item detail page). Upon indicating that an item is added to the virtual drawer the following may occur: if the selected menu item has modifications (mandatory or optional) associated with it, then a menu item modification screen is displayed before adding the item to the drawer (patrons may be required to complete the screen to add the item to the drawer); and, if the selected menu item does not have any modifications associated with it, no modification screen is displayed and the item is added to the drawer. FIG. 17 illustrates the display of a menu item modification screen before the item is added to the virtual drawer, in accordance with certain embodiments. In FIG. 17, a menu item has been already selected, but the patron is required to specify the size of the menu item order in order to have it added to the drawer.

Figure 18:
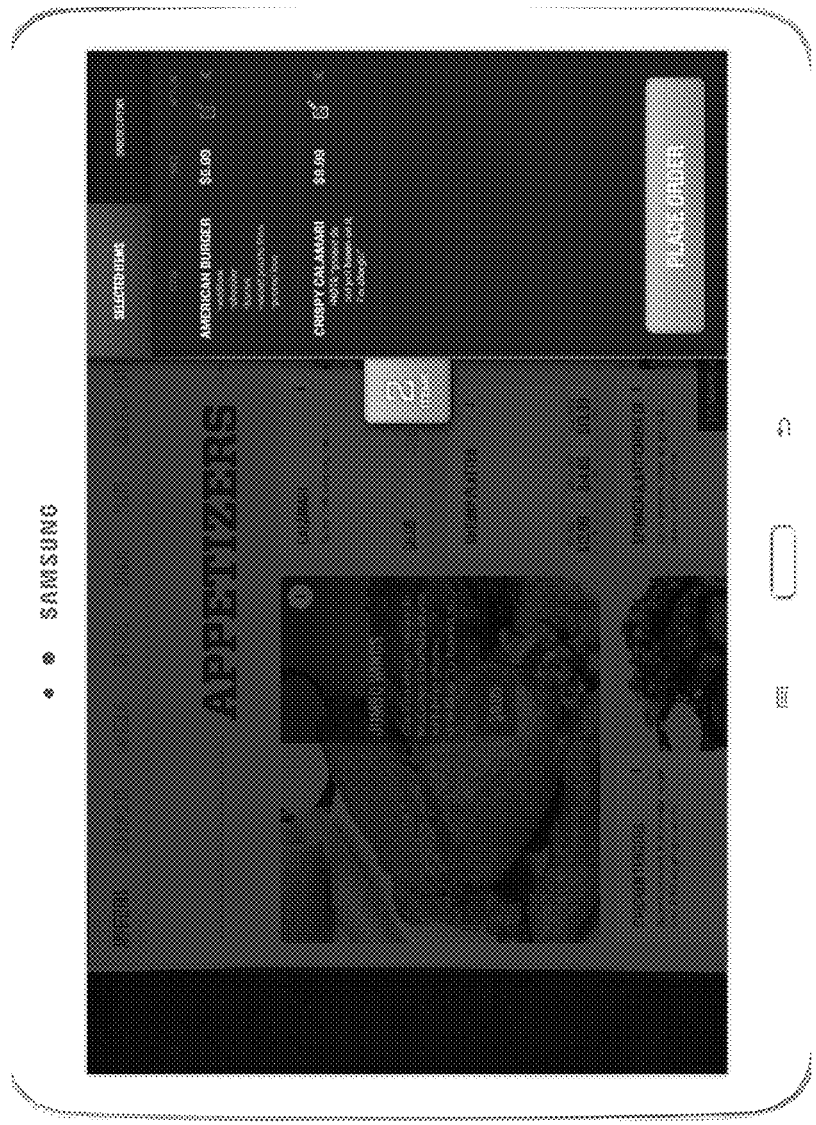
FIG. 18 illustrates a virtual drawer with two items in it, in accordance with certain embodiments.
Figure 19:
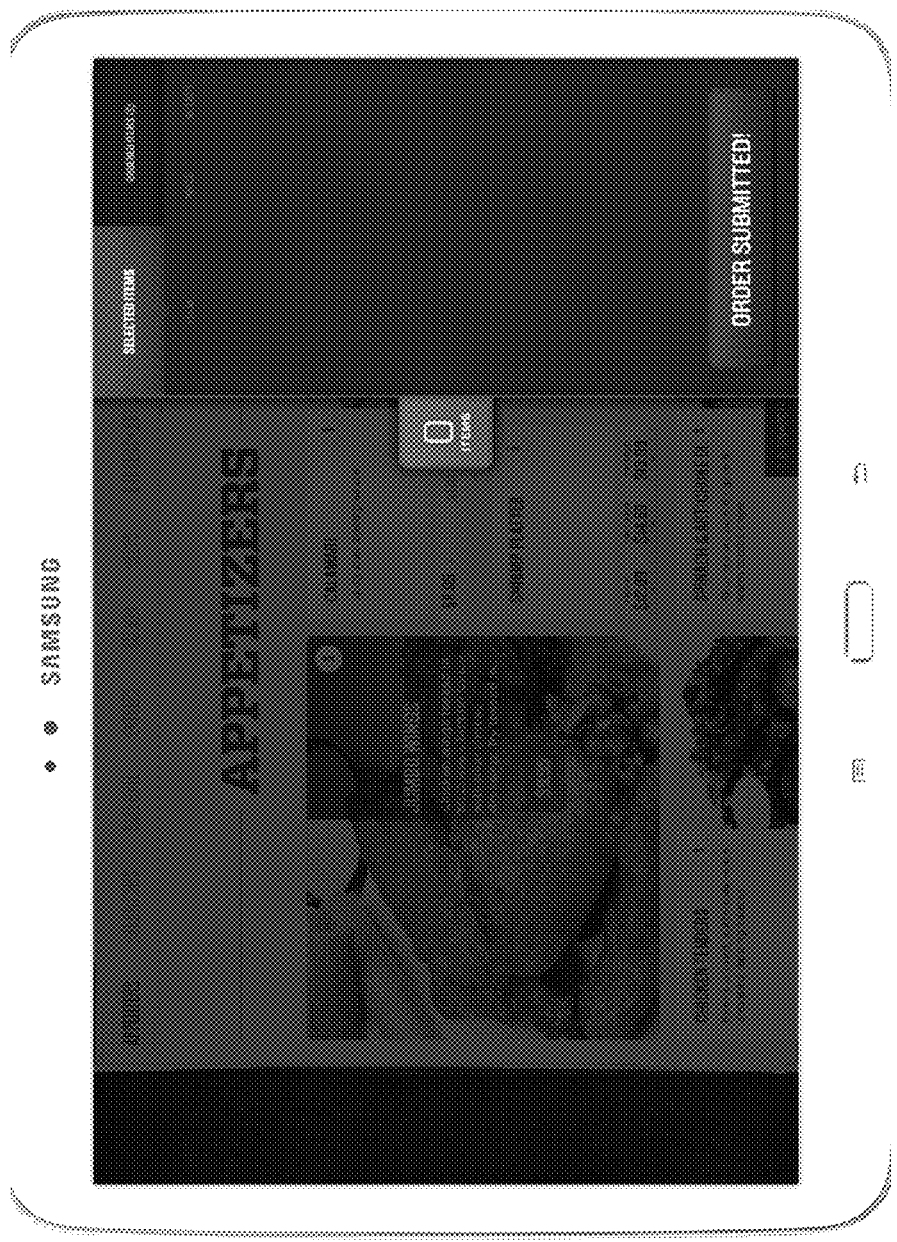
FIG. 19 illustrates when no items are in the tab for selected but not ordered tab in the virtual drawer, in accordance with certain embodiments.
Figure 20:
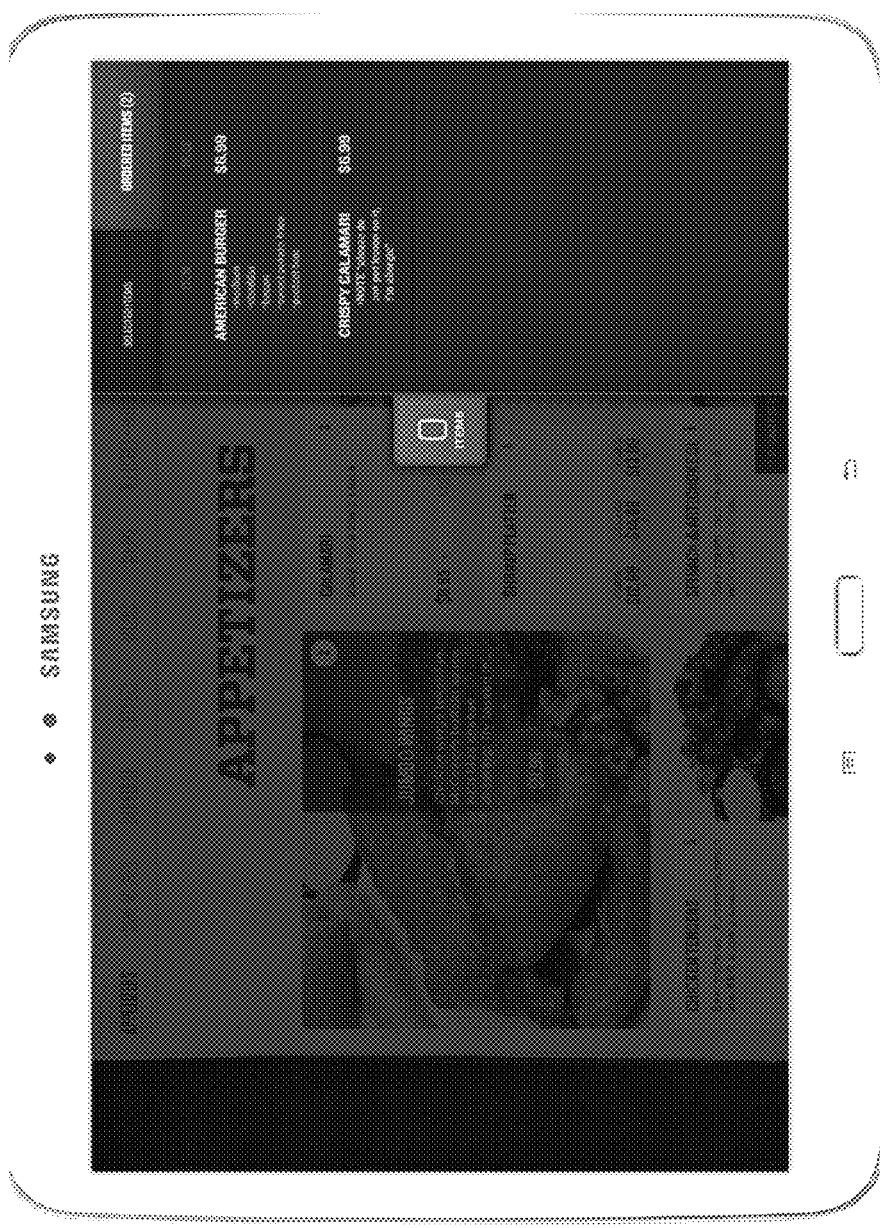
FIG. 20 illustrates the ordered items tab of the virtual drawer indicating that two items have been ordered, in accordance with certain embodiments.
Figure 21:
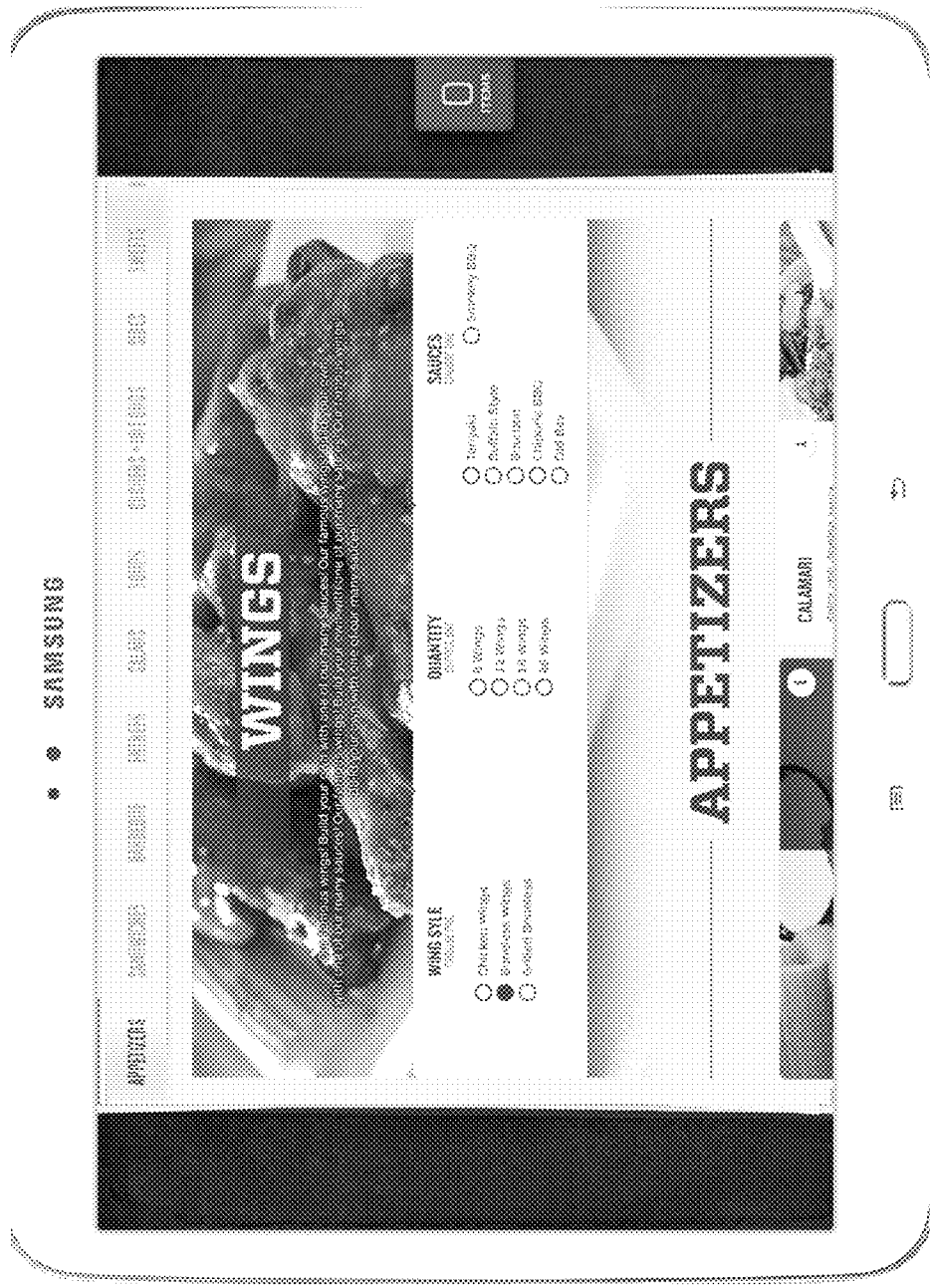
FIGS. 21-27 illustrate example menu screens for build your own types of selections, in accordance with certain embodiments.
Figure 22:
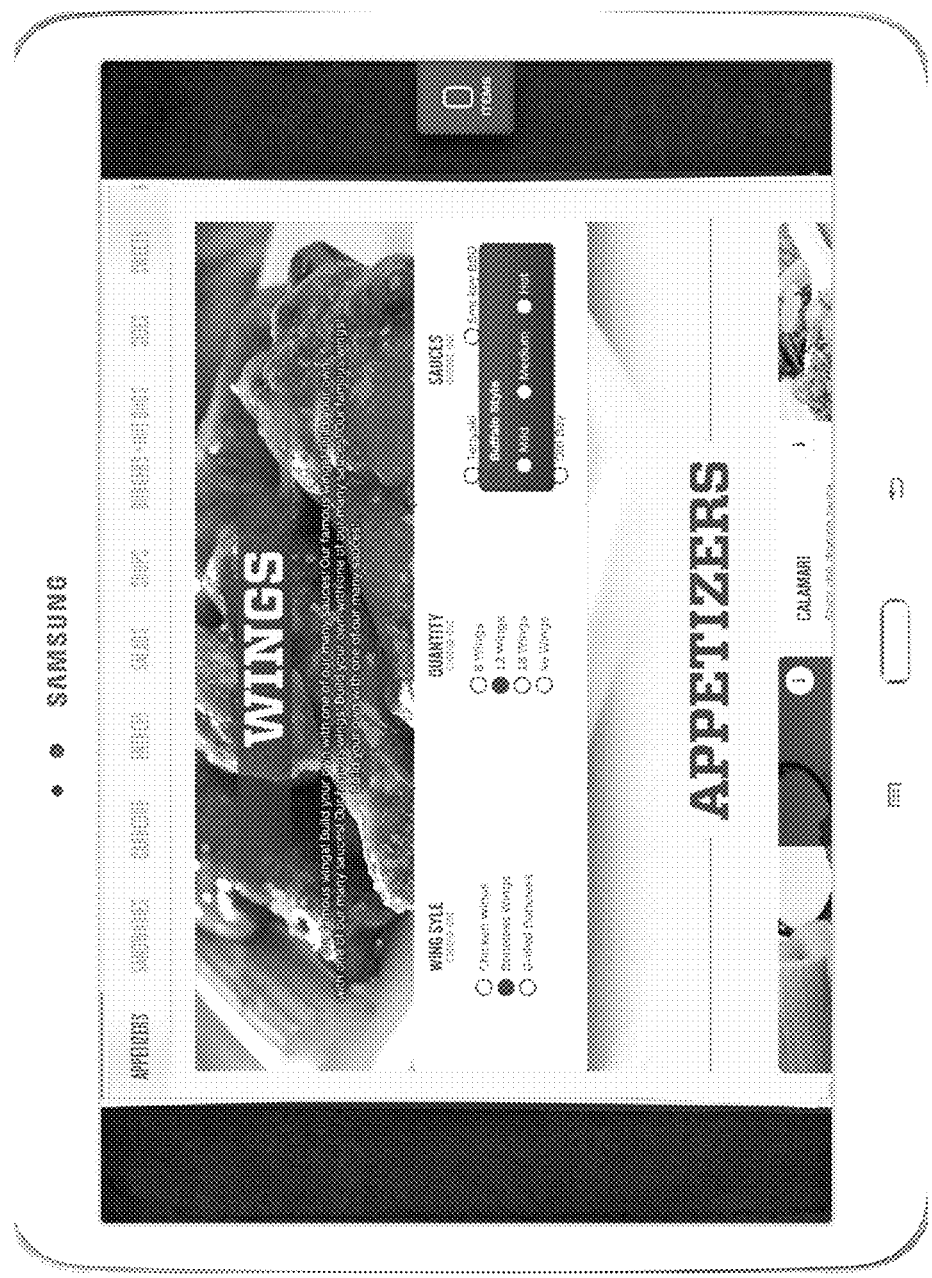
Figure 23:
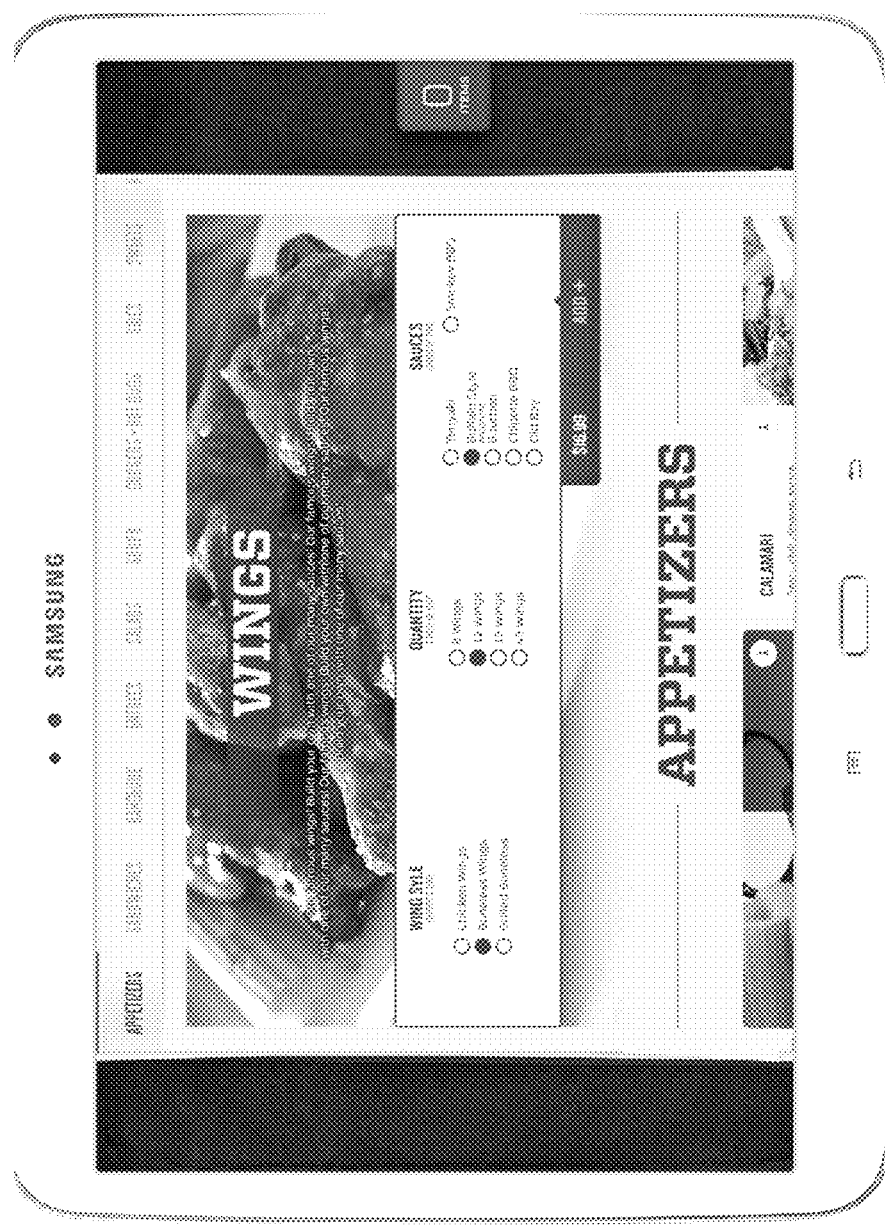
Figure 24:
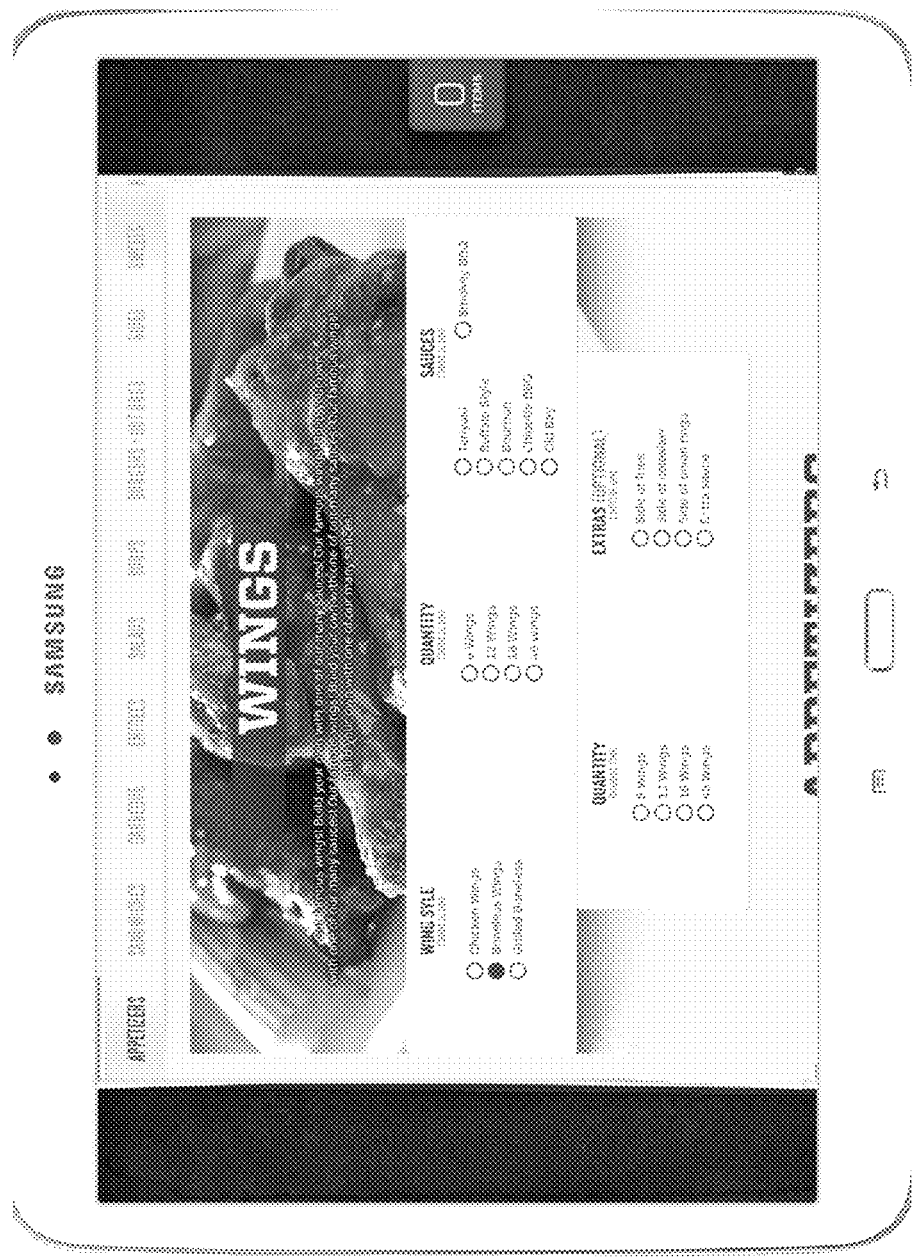
Figure 25:
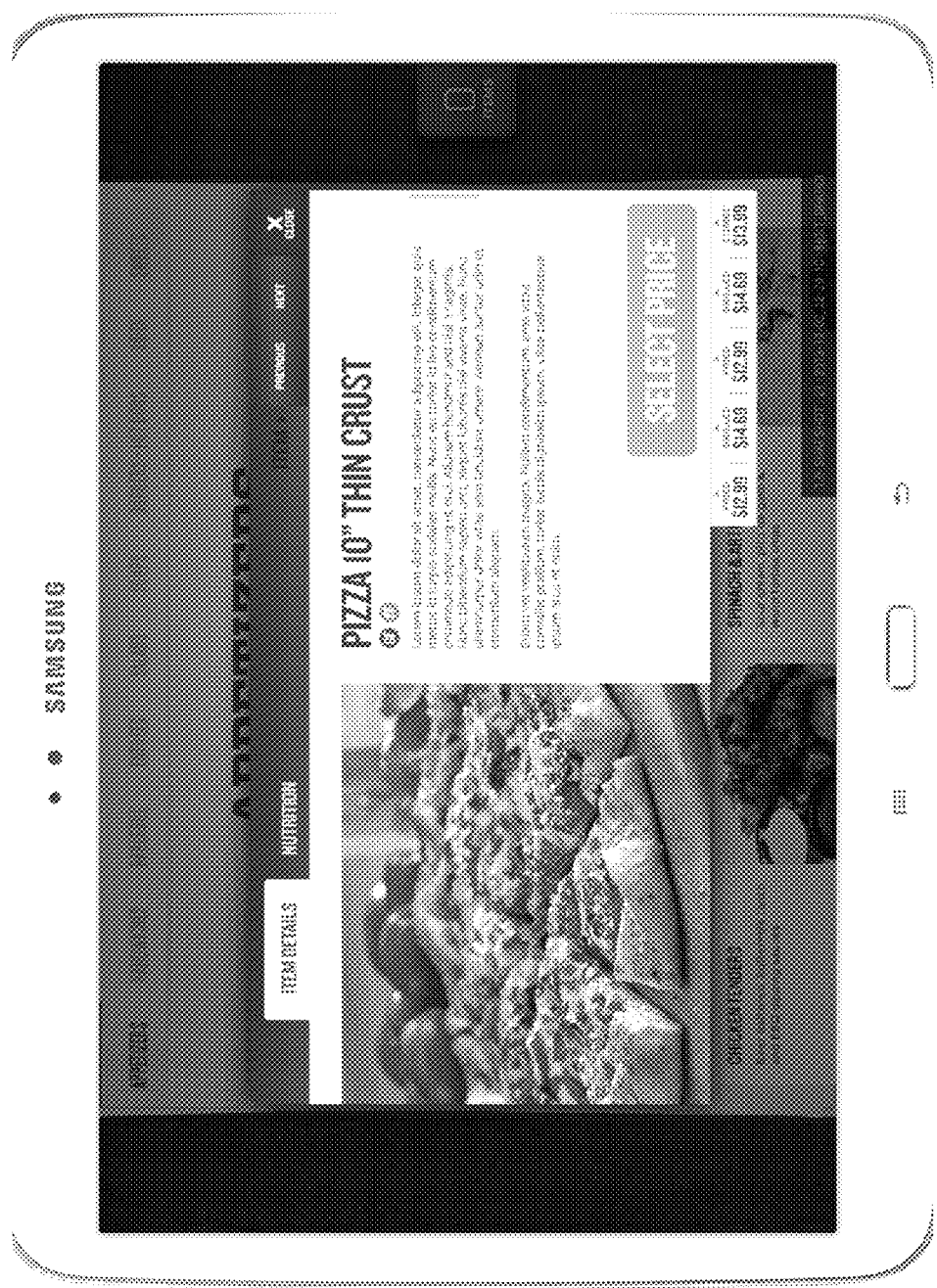
Figure 26:
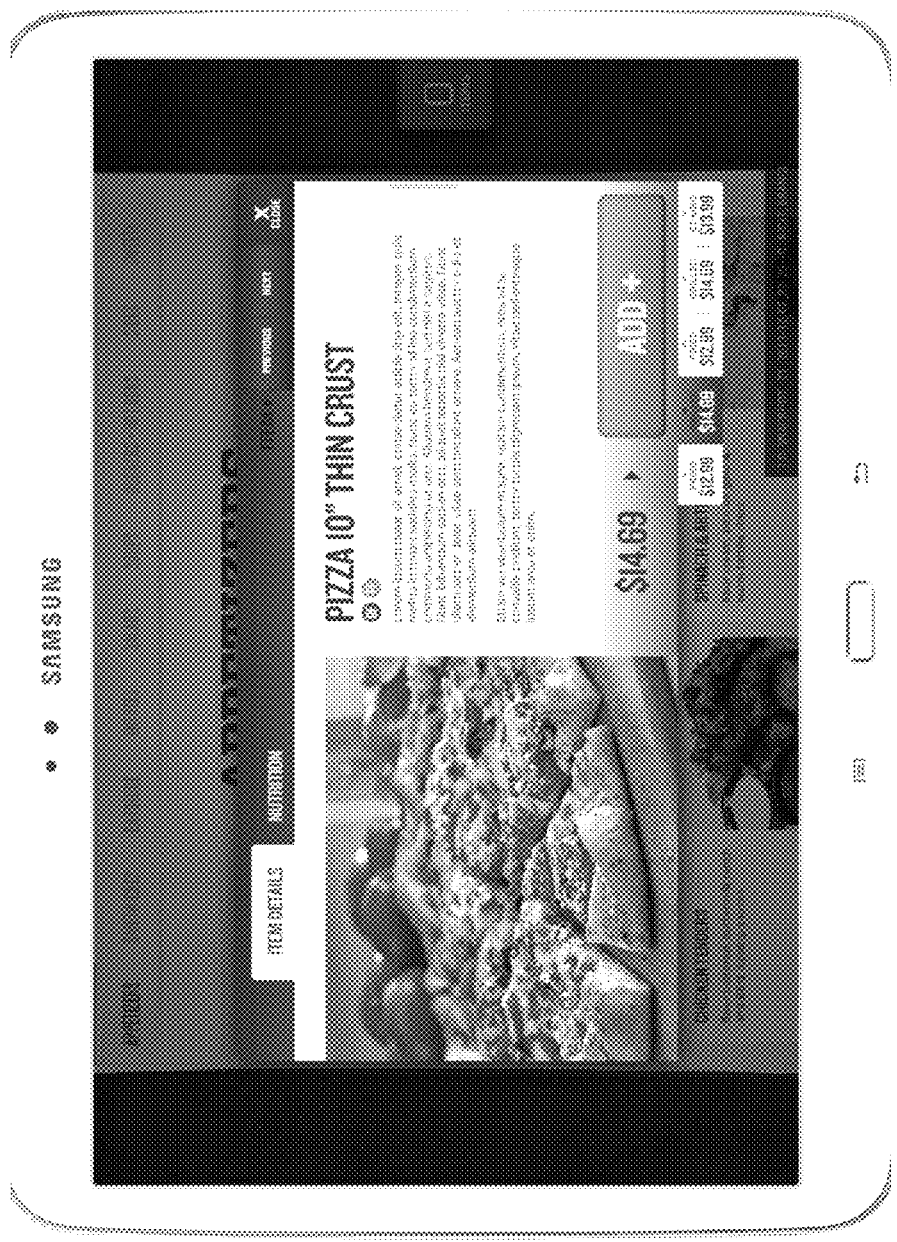
Figure 27:
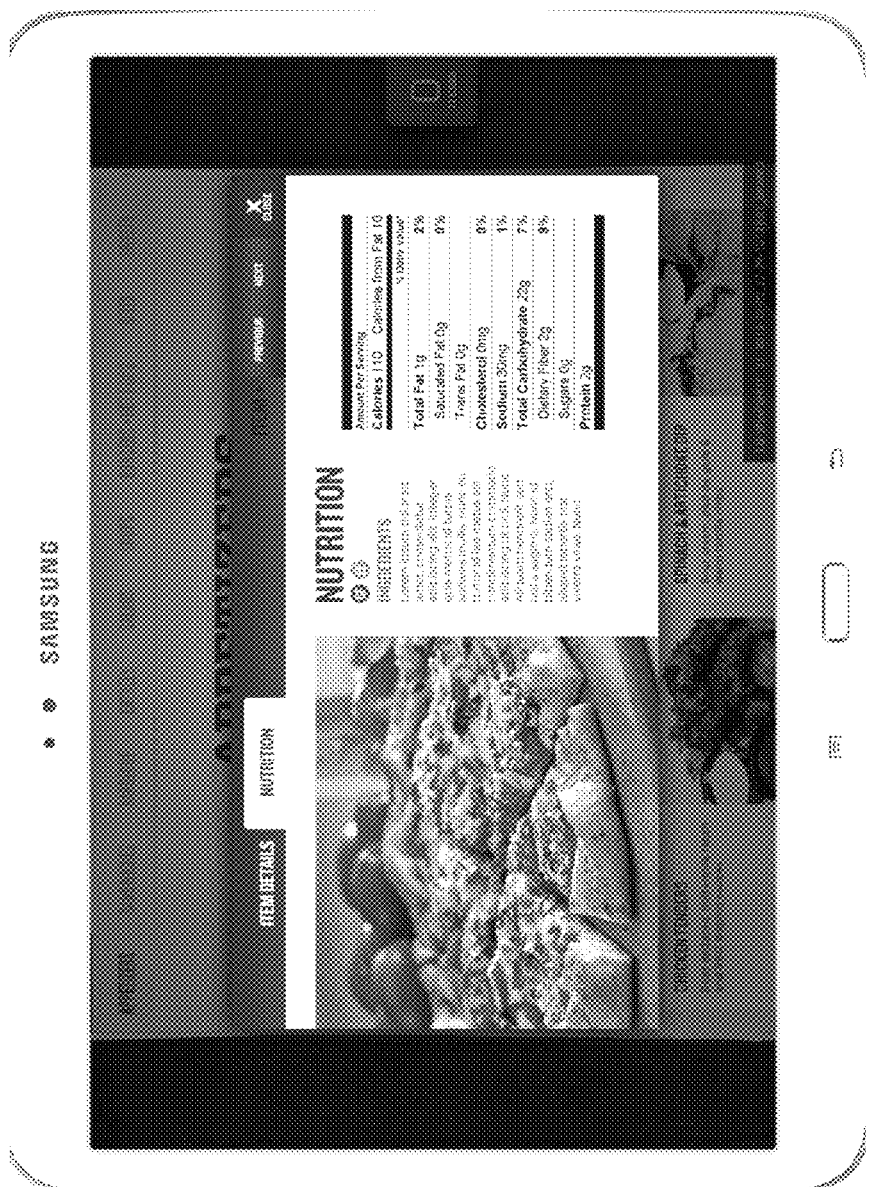
Figure 29:
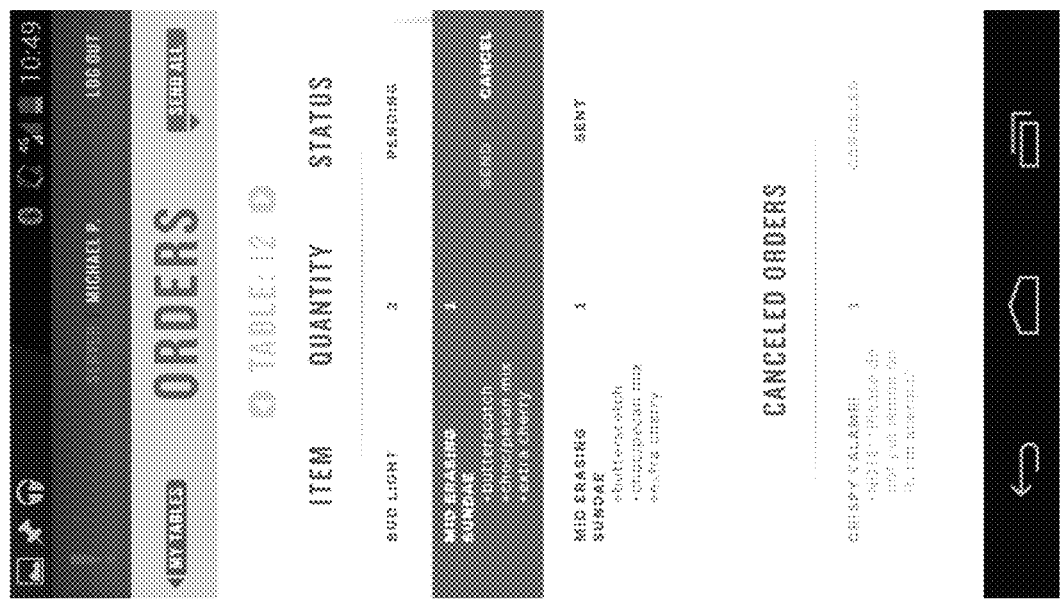
Figure 30:
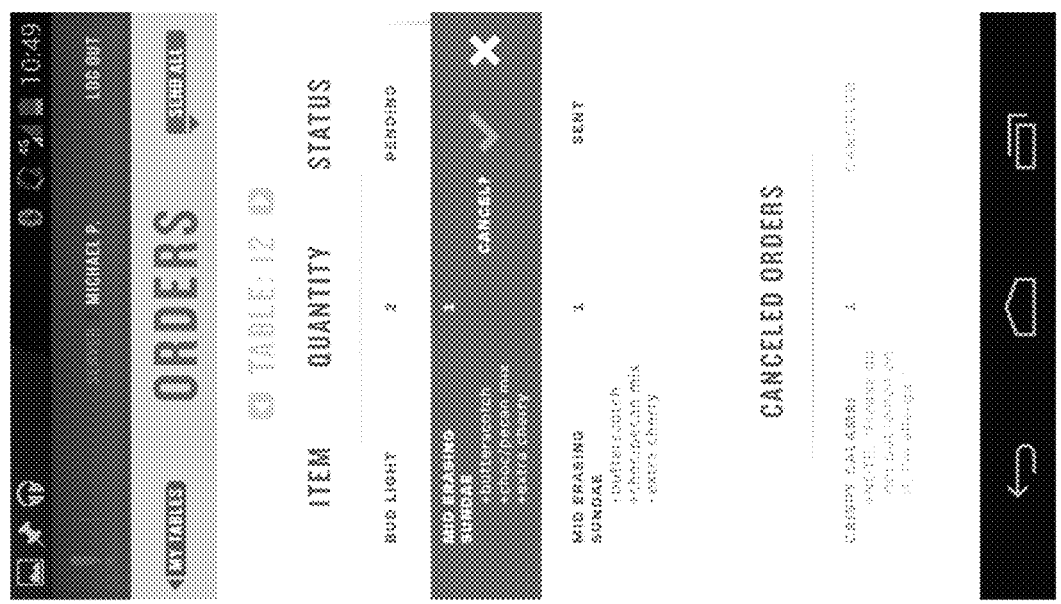

The virtual drawer is such that, when an item is added to the drawer, then the drawer tab may change color (e.g., to green from red) and the total number of items in the drawer is displayed on the tab. The tab may be a color such as red and may display "0 items" until an item is added. Tapping the tab when it is red may result in the drawer being "slid out" and a help message being displayed. FIG. 18 illustrates a virtual drawer with two items in it, in accordance with certain embodiments. FIG. 19 illustrates when no items are in the tab for selected but not ordered tab in the virtual drawer, in accordance with certain embodiments. FIG. 20 illustrates the ordered items tab of the virtual drawer indicating that two items have been ordered.

Because patrons can place multiple orders during the course of a meal, items already ordered may be differentiated from those that have not yet been ordered. Some embodiments include two tabs in the drawer, such as, for example, "NOT YET ORDERED" (or, "ITEMS SELECTED"?) and "TABLE'S BILL".

After the menu item is added to the drawer, the menu item module status changes: the "+" becomes a number, e.g., "1" indicating the number of those items that are in the drawer. This is displayed across all tablets assigned to the same table. If any of the patrons using tablets at that same table (e.g., any of the patron devices having been assigned the same predetermined identifier as the table identifier) taps the number on the menu item module, then another of the same item is added to the drawer; note that if the item has a modification page then that modification page may be displayed and completed every time that item is added to the drawer.

Once a menu item is added to the drawer, that menu item's title (but not description) will display on the "NOT YET ORDERED" tab. Also indicate for each item on the list are the menu item price, modifications selected in the modification screen (if any), an "X" for patrons to remove the item from the list, a pencil icon indicating the patron can add a note to any item in the drawer. If count >1, note applies to all. Note may be limited by the number of characters (e.g., 120). A message box that is clearly associated with the menu item in question and a QWERTY keyboard may display when a patron tabs the pencil icon. The "NOT YET ORDERED" tab may also include a button at the bottom of the tab reading "PLACE ORDER".

The selecting a menu item, may also include selecting one or more options associated with the menu item. The one or more options may be selected from the menu in a drill-down manner (e.g., when menu item is selected, a first level of options are displayed for selection), may be displayed for selection in the display along with the respective menu items, or may be entered in free form text. An example set of drill down options is illustrated in FIGS. 22-27.

At operation 420, the selected menu item is displayed on any other patron-operable devices associated with the same table. If a patron adds a menu item with modifications ("mods") to the drawer, then a screen may be displayed showing all the modifications that the restaurant chooses to present for that item grouped by type and indicating required compared optional.

The modifications screen may have the following features: groups of modifications with a title, "required" or "optional", modification options, and either radio buttons (if mandatory modification) or check boxes (if optional modification) next to each option.

Patrons may select one (and only one) of the forced modifier options in each group. Patrons may select multiple optional modifier options in each group, or may select none.

"Cancel" button that closes the modifications screen and returns the patron to browsing the menu (this could be an "X" in the upper right corner instead of a cancel button if that is more consistent with other screen designs). "Next" button that saves the patron's choices, adds the menu item to the drawer, and closes the modifications screen. The patron may see a transitory message reading "item added" when they tap "Next." If there are required modifications, the "Next" button may be grayed out and unusable until all required selections are made.

If the user taps the grayed out "Next" button, then a message reading "Please make all required selections" may be displayed to keep the user on the modifications screen. The POS may have more options than presented on the example modifications screen.

In some embodiments, one or more of the order items may include highly customizable orders, such as, for example, build your own pizza, etc., that enable the patron to browse through several screens of options, additions, etc., regarding a particular menu item from the higher level of the menu. Example build your own menu item screens are illustrated in FIGS. 21-27.

At operation 422, the patron may determine whether to submit (e.g., place the order for) the selected item. If not submitted, the item remains as selected but not submitted, and operations 416-422 are repeated for selecting one or more other items from the menu.

When, at operation 424, the patron determines to submit one or more items, the submitted item is displayed as such in the other patron-operable devices 202 assigned to the same table. For example, on each device 202 at the same table, a list of items in which the submitted items and selected (but not yet submitted) items are separately identified is displayed in a visually distinguishable manner. Submit may be performed by submitting any one or more selected items currently in the shared drawer at a time. Any of the patron-operable devices assigned to the table can submit the items in the shared drawer. In some embodiments, any of the patrons at the table may make modifications (e.g., change or remove) to any of the items in the shared drawer. In some embodiments, where there is POS integration, the items that have been ordered list from the POS may be displayed, rather than what is tracked locally on the patron-operable devices, as they may differ.

Once at least one item has been placed in the drawer, any patron at the table can submit the order by tapping the "PLACE ORDER" button. When a patron submits the order, the patron is shown a message saying "Your order has been received" and all items in the "NOT YET ORDERED" tab are moved to the "TABLE'S BILL" tab for display.

Patrons can add new items to the "NOT YET ORDERED" tab and submit them as many times through the meal as they wish, or not submit one or more of them.

Order processing flow may be performed in several different ways, depending on whether or not there is POS integration, whether restaurants want items to be sent to the POS automatically or not, and whether or not the item conforms to standard menu items:

When no POS integration is included, manual order processing may be performed. In this scenario, all items (including modifications and free form notes) are sent to the venue computer and from there to the staff-operable handheld associated with the table. The wait staff member may manually enter the items into the POS.

When POS is integrated, automatic processing occurs. In this scenario, the restaurant has chosen to designate some or all menu categories for automatic processing, meaning those items should be routed to the restaurant's POS from the venue computer and sent to the appropriate printers with no manual processing required by staff. Note that, at least in some embodiments, it is possible for a table to submit an order with a mix of automatic and manual menu items.

The submitted items may be routed to the staff-operable device associated with the table, and may visually distinguish between items that have been automatically sent to the POS in contrast to those that require manual approval (e.g., confirmation) by the wait staff member.

When POS is integrated, but some orders require manual approval. Where a restaurant requires that the wait staff member confirms the items ordered (e.g., items in categories set to require manual approval), the wait staff member may approve the order from his staff-operable device. In at least some embodiments, the wait staff member will be able to remove items before approving.

Embodiments may also provide for ordering extraordinary/off-menu items. Patrons may want to order off-menu; either items not on the menu or combinations of modifications/special requests not supported in our UI. It may not be possible to effectively display all options the POS and kitchen can support (and restaurants usually do not want to offer these off-menu items anyway). Wait staff members may become aware of an extraordinary item either through a note attached to an item sent from the tablet, or through a conversation at the table. Either way, and in one or more of the POS integration scenarios above, the wait staff member should enter this custom item at the POS directly and delete the item (if it's not relevant) from their handheld before approving the rest of the order.

Also, when an item or group of items is submitted, the submitted items are displayed on the assigned staff-operable device 208. When an item or group of items are submitted, that is forwarded from the staff-operable device that submits the order to the venue computer. In some embodiments, submitted orders are viewable from any active staff-operable device.

At operation 426, optionally, it is determined whether any of the submitted items are categorized as not requiring the approval (e.g., "confirmation") of the wait staff member. This determination may be based upon a configuration value associated with each ordered item. For example, some appetizers may not require any wait staff member approval. In some embodiments, depending on restaurant configuration and complexity of order, orders will be approved and sent by wait staff members from their devices to the POS, automatically sent from the venue computer to the POS with a notification sent to the handheld, or manually entered into the POS by the wait staff member.

For any submitted items that require wait staff member approval, at operation 428, the wait staff member enters and/or selects his approval. In some embodiments, the wait staff member may modify and/or newly enter information associated with the ordered items. For example, the wait staff member may change the number of portions, preparation preferences etc. The wait staff member may add free-form information to any of the items (e.g., as instructions to the kitchen as directed by a patron). The wait staff member may also disapprove and/or cancel one or more items.

In some embodiments, a wait staff member can access a listing of ordered items associated with a particular table by either selecting the table from a list of active tables, or by selecting an alert received from that table. Example listings of ordered items displayed on a staff-operable device are illustrated in FIGS. 28-31. The listing of ordered items may arrange activity from that table since tablets were assigned (note that patrons may order before the wait staff member starts the table, so those orders may be captured), along with the status and available actions for each menu item.

The listing of the ordered items may include all data captured in the ordering process at the tablet in the order list, including modifications and manual notes entered by patrons. Each menu item may be listed as being "pending"—the default status, indicating that this is a new order that the wait staff member may take action on (e.g., they can either SEND the item to the POS or CANCEL the item from the order); "sent"—the order has been sent to the POS, where POS integration exists, some categories of menu items may be automatically sent to the POS without wait staff member action; this is up to each restaurant; or "cancelled"—the wait staff member manually canceled this menu item within the handheld UI; it was not and will not be sent to the POS. In some embodiments, the wait staff member is able to send all pending items to the kitchen by selecting a single button.

At operation 430, items that are approved by the wait staff member and/or items that were indicated as not requiring wait staff member approval is transmitted to an entity so that the items may be prepared. For example, upon receiving the approval of the wait staff member for one or more submitted items the venue computer 208 transmits a listing including the items, information provided by the patron or wait staff member for each item, and an identification of the patron and/or table to a kitchen for preparation of the item.

At operation 432, optionally venue computer 208 may transmit the items to a POS 210. Wait staff member-facing functionality on the staff-operable device for the order list is the same whether or not there is POS integration, but there may be differences to both back end workflow and restaurant operations workflow with or without POS integration.

With POS Integration: restaurants can designate categories of menu items to automatically be sent to the kitchen, so wait staff members may see items with a "SENT" status without submitting the order themselves; When a wait staff member "SENDS" an item or group of items, those items are sent to the POS; The ORDER LIST may contain items that were not ordered through the tablets—e.g., items ordered through the POS directly.

Without POS integration, the order list may function like a digital notepad: wait staff members can keep track of which items they have manually entered in the POS vs. which are new using the same action buttons.

In some embodiments, a staff-operable device may receive alerts from the associated patron-related devices, other staff-operable devices, by the POS system, and/or the venue computer. Alerts may be useful for good customer service. For example, alerts notify wait staff members of actions they need to take for their tables and allow patrons to drive their own service experience.

Figure 32:
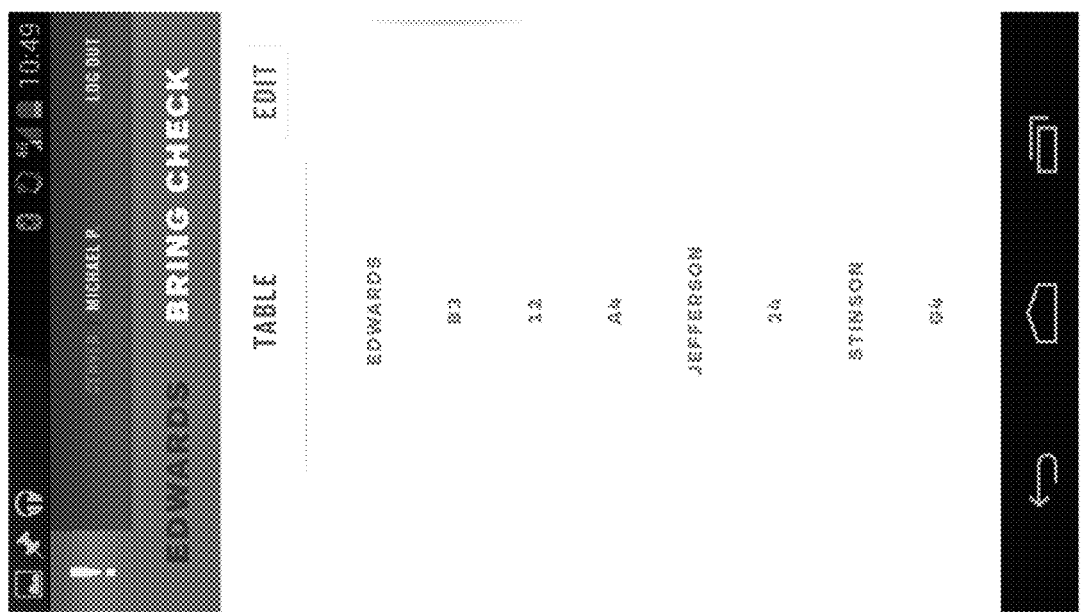
FIGS. 32-34 illustrate example listings of alerts on a staff-operable device, in accordance with certain embodiments.
Figure 33:
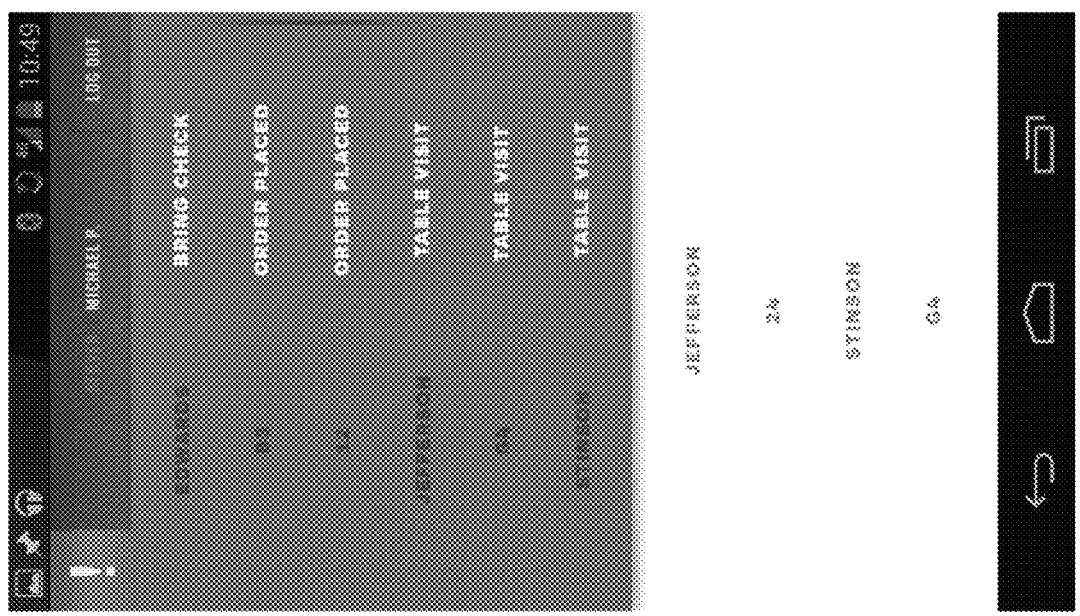
Figure 34:
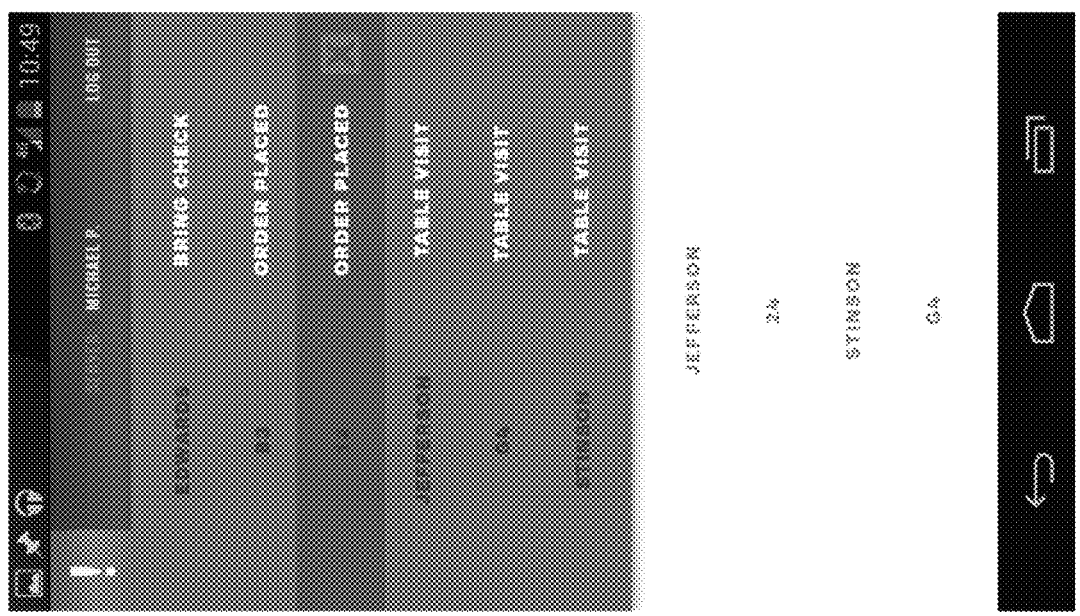

In some embodiments, alerts are shown on all pages/modules of the staff-operable device at all times. Example listings of alerts on a staff-operable device are illustrated in FIGS. 32-34. Additionally, the staff-operable device may be configured to for example, buzz, vibrate, or flash when an alert is delivered. A patron-operable device may generate an alert to the corresponding staff-operable device for reasons such as, but not limited to, indicating that the patrons are ready for the check, requesting the attention of the wait staff member, or when a new order is entered by a patron. The POS system may alert the staff-operable device when the table has completed payment.

In operations discussed above, information regarding the items ordered (e.g., such as by finalizing one or more selected but not yet ordered items based on patron input) on one patron device is received by other patron devices assigned to the same table and the staff device assigned to the same table. In some embodiments, the communication between the patron devices or a patron device and the corresponding staff device is via one or more other computers, such as, for example, the venue computer. For example, the venue computer may, based on its knowledge regarding the devices being assigned the same table may retransmit information received from a patron device or staff device to other devices associated with the same table. In some other embodiments, upon being assigned a table, each patron device and staff device may be provided with the information that it may itself use for transmitting (e.g., by multicast, broadcast, or repeated transmission of a particular piece of information to respective devices) information directly to the patron devices and/or staff device(s) associated with the same table.

At operation 434, the table is closed out. For example, after the patron has paid the bill, venue computer 208 or staff-operable device 204 may indicate that the transactions associated with the table has been completed. Closing out the table causes venue computer 208 to record that the table is inactive and to release the association between the table and the currently associated staff-operable device 204. Closing out the table may also include removing the association to the table from the currently associated staff-operable device 204.

Closing out the table, for example, at the end of the meal when the patrons leave the table, may be performed by the wait staff member indicating on his list of active tables that the table is now "ended." For example, they may do this by tapping an END button in the "MY ACTIVE TABLES" list next to the relevant table. Ending a table may do the following: resets all tablets currently assigned to that table number; removes the table from the wait staff members "MY ACTIVE TABLES" list; removes the table from the "SHOW ALL TABLES" list; clears all alerts and the order list for that table number.

At operation 436, staff-operable device is closed out. Closing out the staff-operable device may include logging off the wait staff member. In some embodiments, when the wait staff member is logged in to a staff-operable device, the wait staff member's name (e.g., "Michael P.") and a "log out" button may be displayed at all times during when the wait staff member is logged into the device.

If the wait staff member taps the "log out" button, he or she may be prompted with an overlay message: "Are you sure you want to log out?" with "LOG OUT" and "CANCEL" buttons. If the user taps "CANCEL" the overlay closes. If the user taps "LOG OUT" then a check may be made for unfinished tasks. The unfinished tasks to be checked for may include whether there any active tables assigned to this wait staff member, whether there any unresolved orders waiting for wait staff member approval in any active tables, and whether there are any service alerts that have not been dismissed by the wait staff member. If there are there any active tables assigned to this wait staff member, then an overlay message "You have active tables. Are you sure you want to log out?" with "LOG OUT" and "CANCEL" buttons may be displayed. If there are there any service alerts that have not been dismissed by the wait staff member, then an overlay message, "You have active alerts. Are you sure you want to log out?" with "LOG OUT" and "CANCEL" buttons, may be displayed.

If the wait staff member has active tables when they log out of the handheld, then those tables may be changed to "UNCLAIMED" and provided for being assigned to an available wait staff member.

The menu icon in the upper left corner may be used to enable patrons to access other content provided through the device such as, for example, the entertainment offerings noted above.

A user may select an item (e.g., through a touch interface provided by the device), confirm that it should purchased, and add it to an order. In certain example embodiments, coordination may be provided between the patrons at a given table and/or in a given party. For instance, because each patron may be provided with his/her own device, all orders may be added to a single order and synchronized so that the order is placed at once. Similarly, updates may be pushed to a table at a time, e.g., once the order has been entered, prepared, delivered, when the check is ready, etc.

In certain exemplary embodiments, payment may be processed using the techniques set forth in U.S. Application Ser. No. 61/875,195, filed on Sep. 9, 2013, the entire contents of which are hereby incorporated by reference herein.

It will be appreciated that although certain exemplary embodiments involve a row-by-row top-to-bottom approach, the same or similar techniques may be used on a row-by-row bottom-up basis, in a column-by-column left-to-right or right-to-left approach, etc. Similarly, although certain exemplary embodiments involve a left-to-right approach, right-to-left, top-to-bottom, bottom-to-top, and/or the like may be used in different exemplary embodiments.

It is noted that the example algorithms discussed herein are sufficiently generic to accommodate different numbers of columns in a grid, different numbers of cells used by menu items, and/or the like.

In view of the foregoing, it will be appreciated that certain exemplary embodiments provide systems and methods for ordering items using electronic menus displayed on patron-operable devices, and/or for servicing such orders by wait staff using staff-operable devices. The exemplary embodiments provide for synchronization of menu information, ordered item information, order status information, and/or other associated information among patron-operable devices and staff-operable devices, and thus provide for improved customer experience and improved efficiencies. The exemplary embodiments enable the patrons to be more fully and accurately informed of the menu choices, to easily provide instructions regarding his/her preferences to the restaurant, to conveniently be informed of what other patrons at the same table have ordered, and to maintain a high degree of control in relation to the order. The exemplary embodiments also provide the wait staff the ability to reduce errors in taking orders, to maintain a high degree of control regarding the order, to provide accurate instructions to the kitchen and to the POS, to be accurately informed regarding the status of each table being serviced, to perform tasks such as moving and/or transferring a table, etc. Moreover, in embodiments, the menu information may be stored in servers accessible in the cloud so that additional efficiencies can be achieved across multiple locations of a restaurant.

While the preferred aspects of the invention have been illustrated and described herein, it will be apparent to one of ordinary skill in the art that various changes and/or modifications can be made. Thus, the specific description herein is meant to be exemplary only and is not intended to limit the invention beyond the terms of appended claims.

What is claimed is:

1. A method for ordering items from an electronic menu, in a networked computing environment that communicably connects via a local area network in a venue at least a plurality of first handheld electronic devices, a plurality of second handheld electronic devices and a venue computer, the method comprising:

associating a predetermined identifier with a first handheld electronic device, the predetermined identifier identifying a group of two or more of the first handheld electronic devices, wherein the associating includes recording in a memory of the venue computer respective entries each associating a respective one of the handheld electronic devices in the group with the predetermined identifier, wherein the identified group is one of a plurality of groups each comprising two or more of the first handheld electronic devices and each being identified by a respective predetermined identifier;

displaying at least a part of the electronic menu of order items on a display of at least one of the two or more the first handheld electronic devices;

receiving, at each of the two or more first handheld electronic devices in the group, input selecting one or more order items from the displayed menu for an order, wherein the order comprises the one or more selected order items s;

receiving input indicating finalizing of the order comprising the selected one or more order items;

based upon a selection of the predetermined identifier on a display of a second handheld electronic device configured differently than the first handheld electronic device or based upon an input of the predetermined identifier to the second handheld electronic device, associating the second handheld electronic device with the group of the two or more first handheld electronic devices that are each associated with the predetermined identifier;

receiving, at the second handheld electronic device, the finalized order for one or more order items from at least one of the two or more first handheld electronic devices associated with the predetermined identifier;

displaying the received order on a display of the second handheld electronic device; and based upon an input received at the second handheld electronic device, transmitting one or more of the order items to the venue computer for further consideration of the one or more order items.

2. The method according to claim 1, further comprising updating a list of ordered items displayed on at least one of the two or more first handheld electronic devices based upon items ordered using other of the two or more first handheld electronic devices associated with the predetermined identifier.

3. The method according to claim 2, wherein each first handheld electronic device is a patron-operated device.

4. The method according to claim 1, wherein each of the first handheld electronic devices is a patron-operated device.

* * * * *